United States Patent [19]
Sato et al.

[11] Patent Number: 6,038,104
[45] Date of Patent: Mar. 14, 2000

[54] ROTATING DISK TYPE INFORMATION STORAGE APPARATUS HAVING A MOVABLE MEMBER INTEGRATED WITH A SUPPORT MEMBER

[75] Inventors: Kazutaka Sato, Kashiwa; Takeshi Harada, Abiko; Shozo Saegusa, Ibaraki-ken; Shinobu Yoshida, Tsuchiura; Toshihiro Arisaka, Ibaraki-ken, all of Japan

[73] Assignee: Hitachi, Ltd., Tokyo, Japan

[21] Appl. No.: 08/958,667

[22] Filed: Oct. 27, 1997

[30] Foreign Application Priority Data

Oct. 31, 1996 [JP] Japan .................................. 8-289710

[51] Int. Cl.$^7$ ..................................................... G11B 5/54
[52] U.S. Cl. ........................................... 360/106; 360/109
[58] Field of Search ..................................... 360/104, 106, 360/109

[56] References Cited

U.S. PATENT DOCUMENTS

| | | | |
|---|---|---|---|
| 4,374,402 | 2/1983 | Blessom et al. | 360/104 |
| 4,814,908 | 3/1989 | Schmitz | 360/109 |
| 5,189,578 | 2/1993 | Mori et al. | 360/106 |
| 5,216,559 | 6/1993 | Springer | 360/106 |
| 5,303,105 | 4/1994 | Jorgenson | 360/106 |
| 5,367,420 | 11/1994 | Yagi et al. | 360/109 |
| 5,400,192 | 3/1995 | Mizoshita et al. | 360/106 |
| 5,440,437 | 8/1995 | Sanada et al. | 360/104 |
| 5,521,778 | 5/1996 | Boutaghou et al. | 360/106 |
| 5,657,188 | 8/1997 | Jurgenson et al. | 360/106 |
| 5,682,076 | 10/1997 | Zumeris | 360/109 |
| 5,764,444 | 6/1998 | Imamura et al. | 360/109 |
| 5,781,381 | 7/1998 | Koganezawa et al. | 360/106 |
| 5,793,571 | 8/1998 | Jurgenson et al. | 360/104 |
| 5,796,558 | 8/1998 | Hanrahan et al. | 360/106 |

FOREIGN PATENT DOCUMENTS

| | | |
|---|---|---|
| 0529987 | 3/1993 | European Pat. Off. . |
| 0549814 | 7/1993 | European Pat. Off. . |
| 1-116973 | 10/1987 | Japan . |
| 62-250570 | 10/1987 | Japan . |
| 2550488 | 8/1996 | Japan . |

OTHER PUBLICATIONS

"Shock–Resistant Rotary Microactuator for Fine Positioning of Recording Heads", IBM Technical Disclosure Bulletin, vol. 37, No. 8, pp. 401–403, Aug. 1, 1994.

Tang et al., "Silicon Micromachined Electromagnetic Microactuators for Rigid Disk Drives", 1995 Digests of Intermag, International Magnetics Conference, San Antonio, pp. ED–08, Apr. 18, 1995, Institute of Electrical and Electronics Engineers.

*Primary Examiner*—Jefferson Evans
*Attorney, Agent, or Firm*—Antonelli, Terry, Stout & Kraus, LLP

[57] ABSTRACT

A rotating disk type information storage apparatus includes a rotating disk for storing information, a head for writing/reading the information, a support member for supporting the head, a first actuator for moving the support member to a predetermined position on the rotating disk, and a second actuator including a movable member supported by the support member and capable of being rotated about an axis perpendicular to a recording surface of the rotating disk, and a driving force generating member for rotating the movable member. The movable member is integrated with the support member and has the head mounted thereto, in which a center of gravity of the movable member including the mounted members generally coincides with the center of rotation of the movable member. The second actuator corrects an error in a positioning of the support member and positions the head, and the movable member is not vibrated during the positioning.

25 Claims, 14 Drawing Sheets

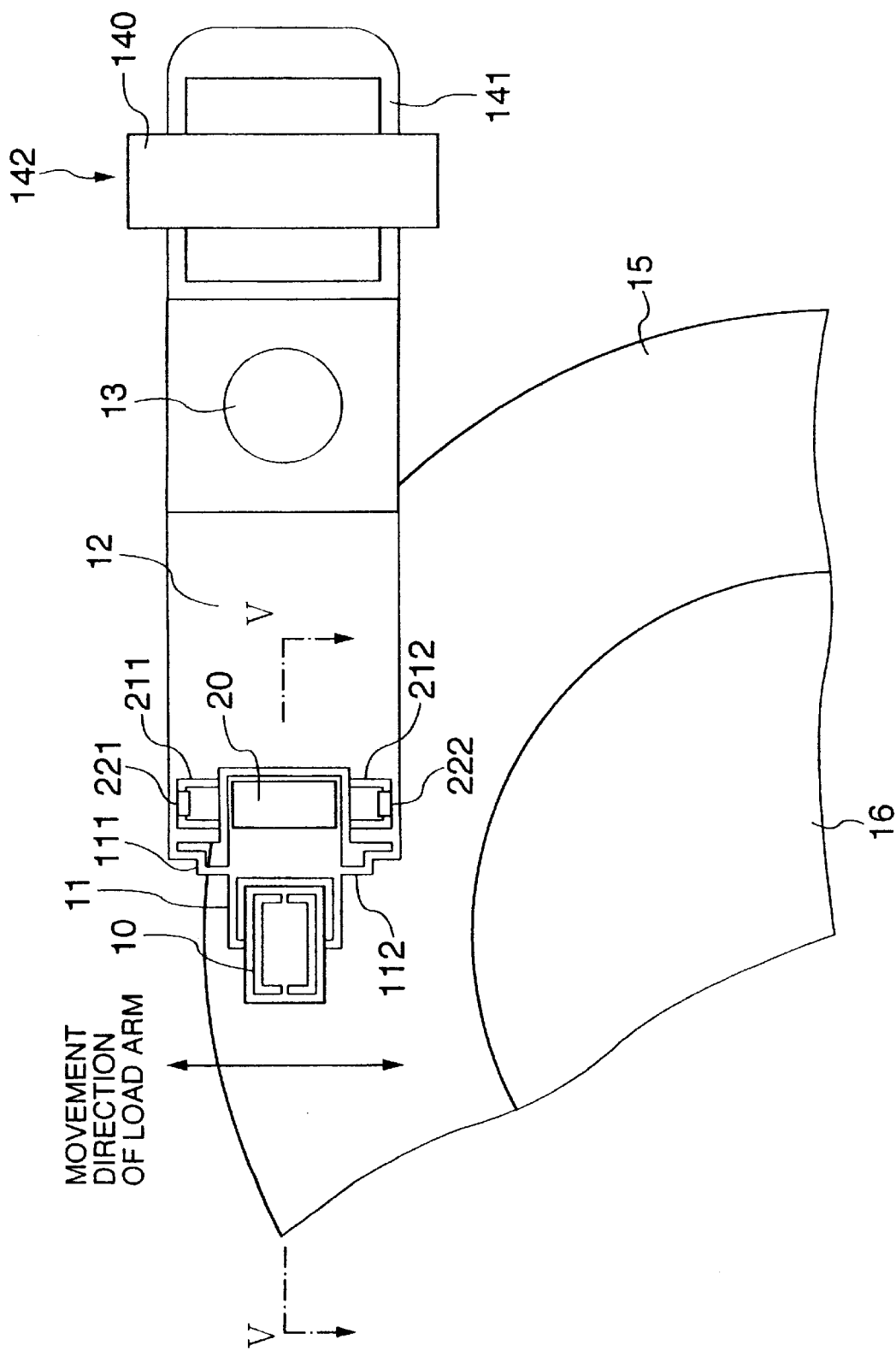

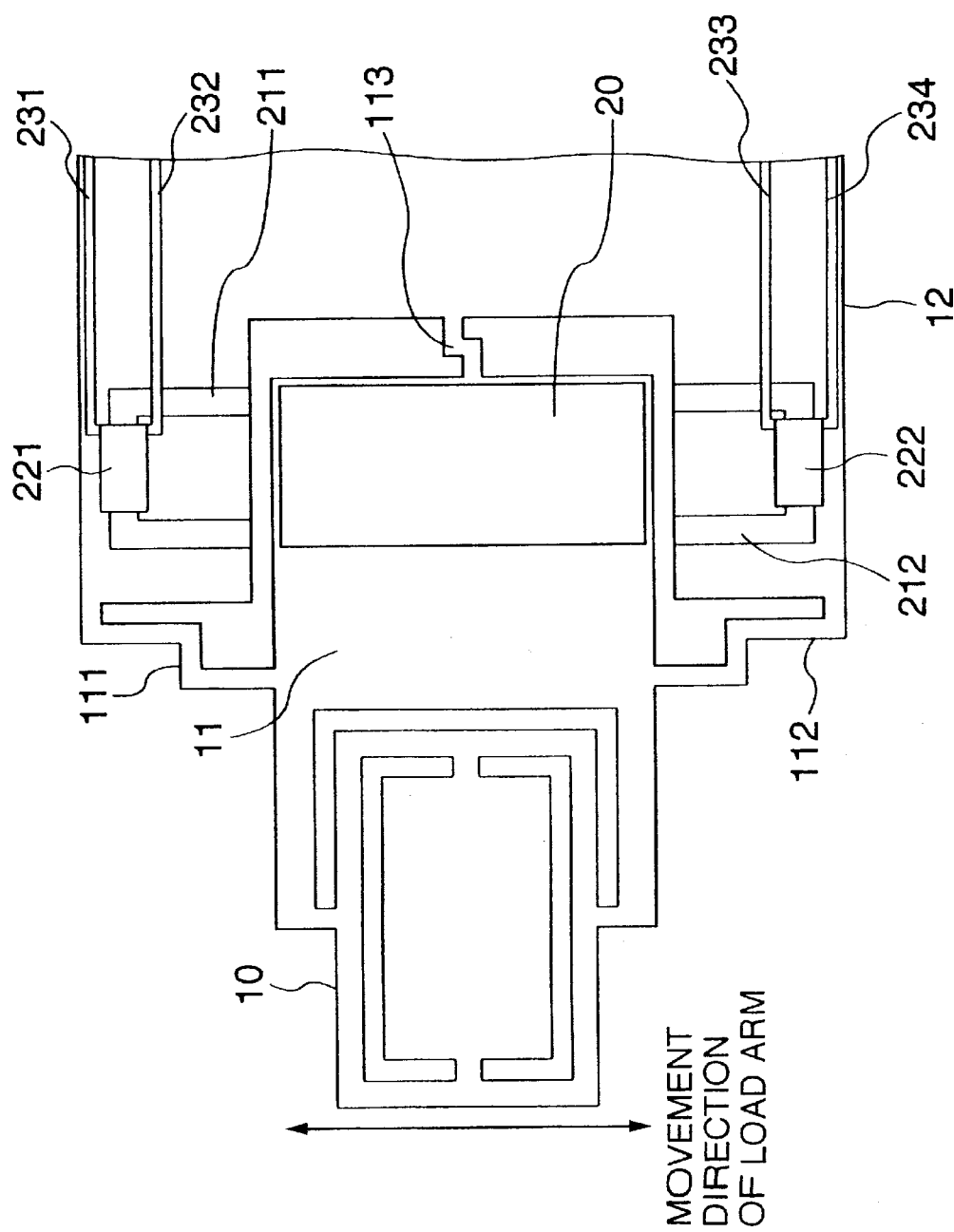

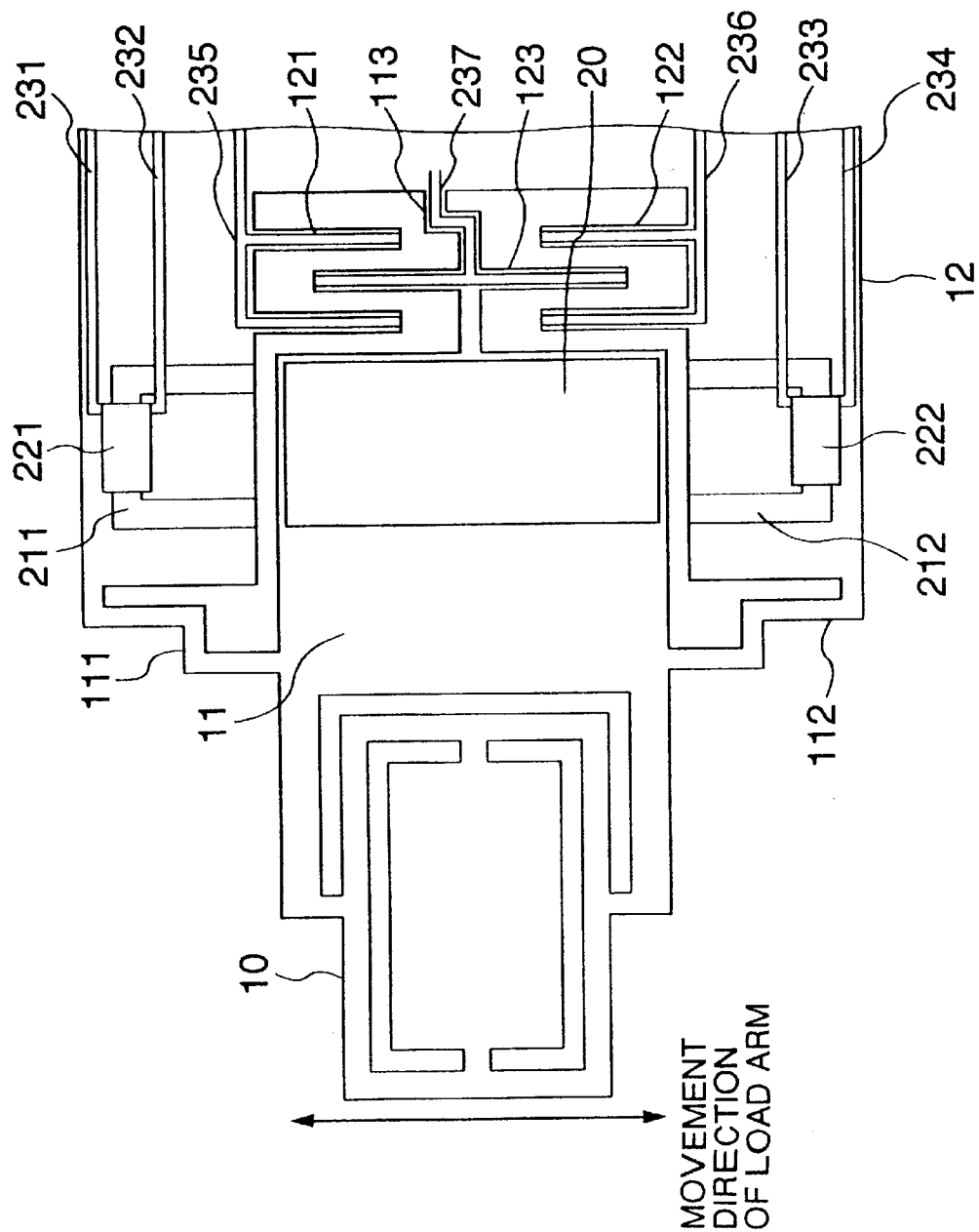

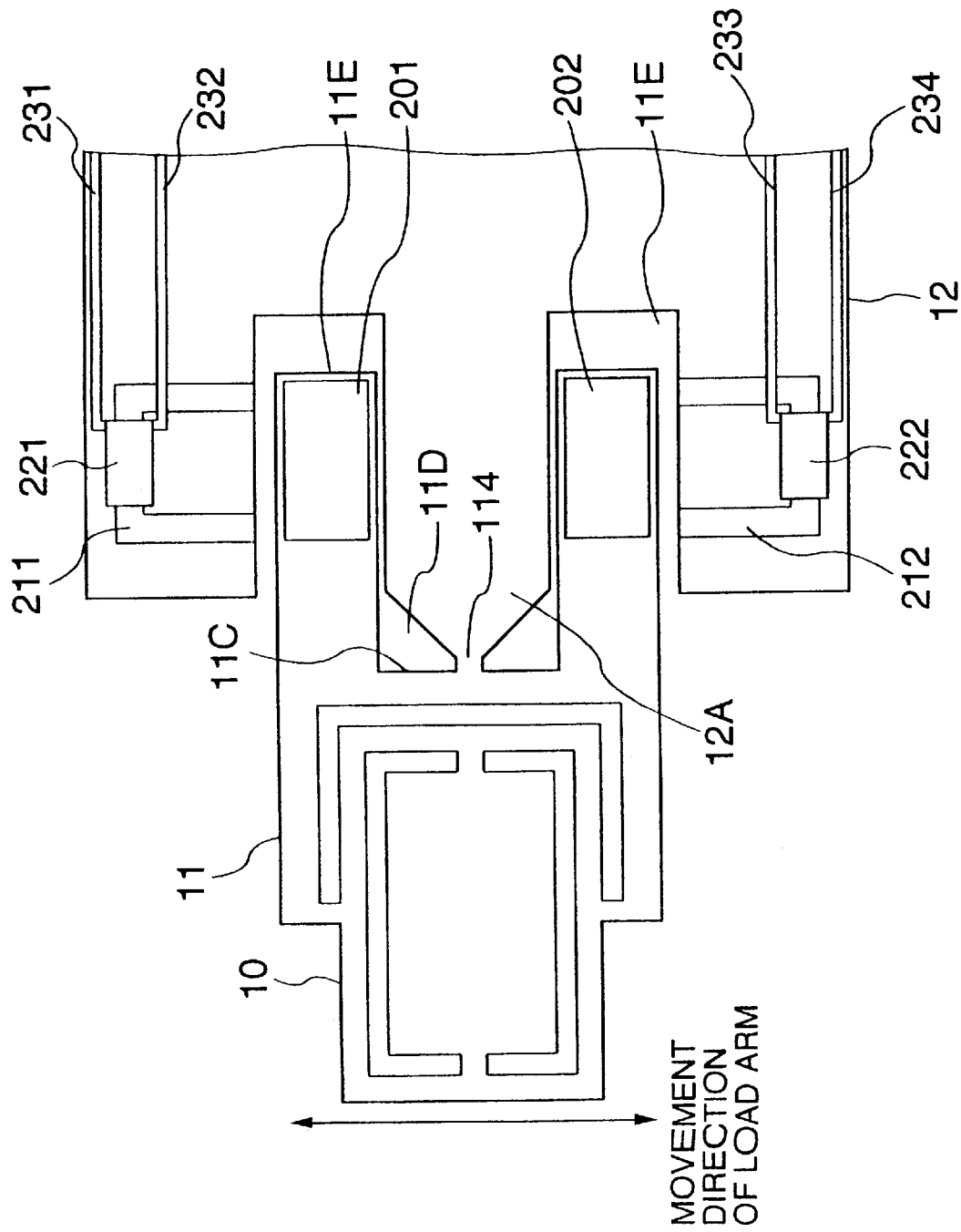

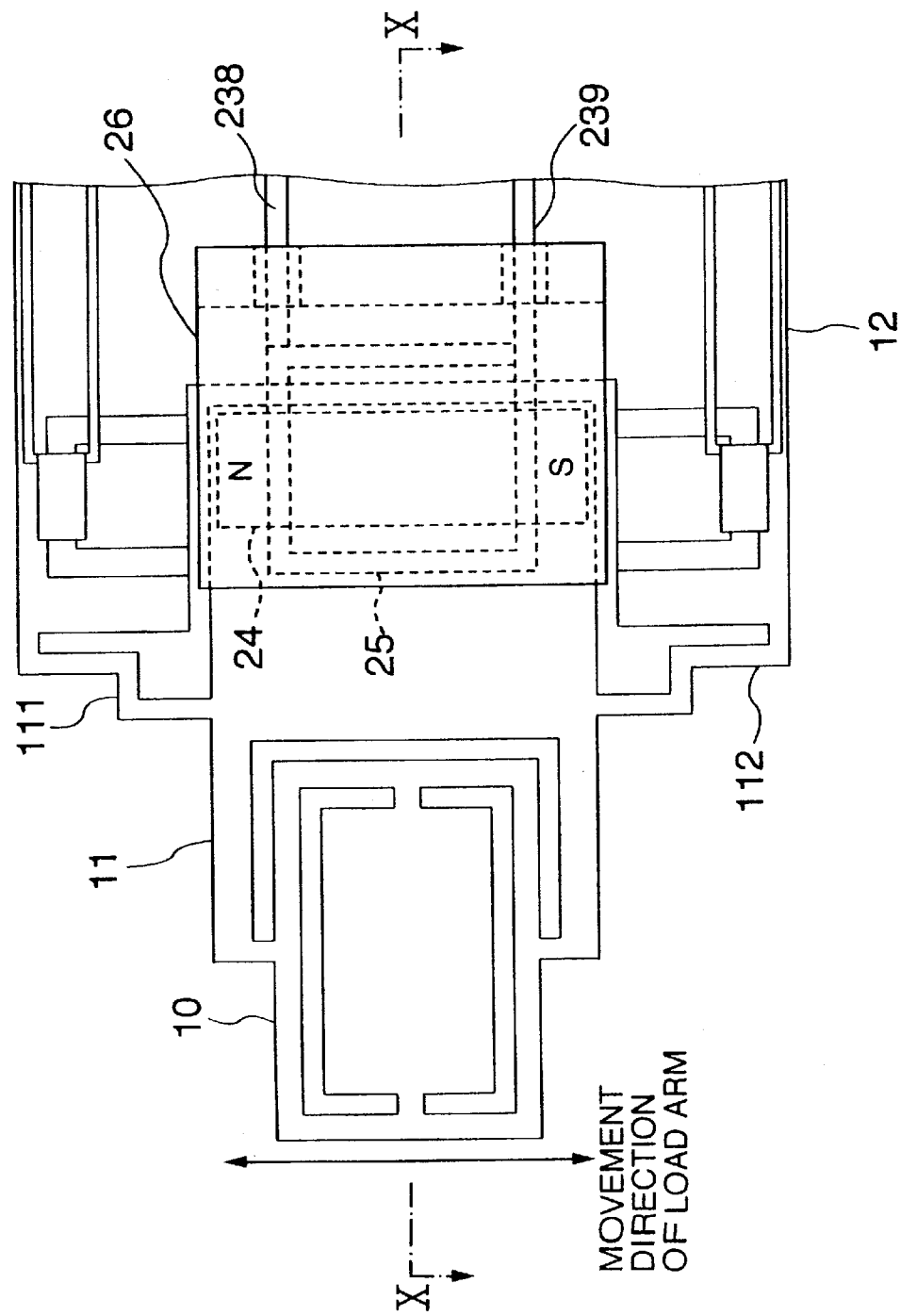

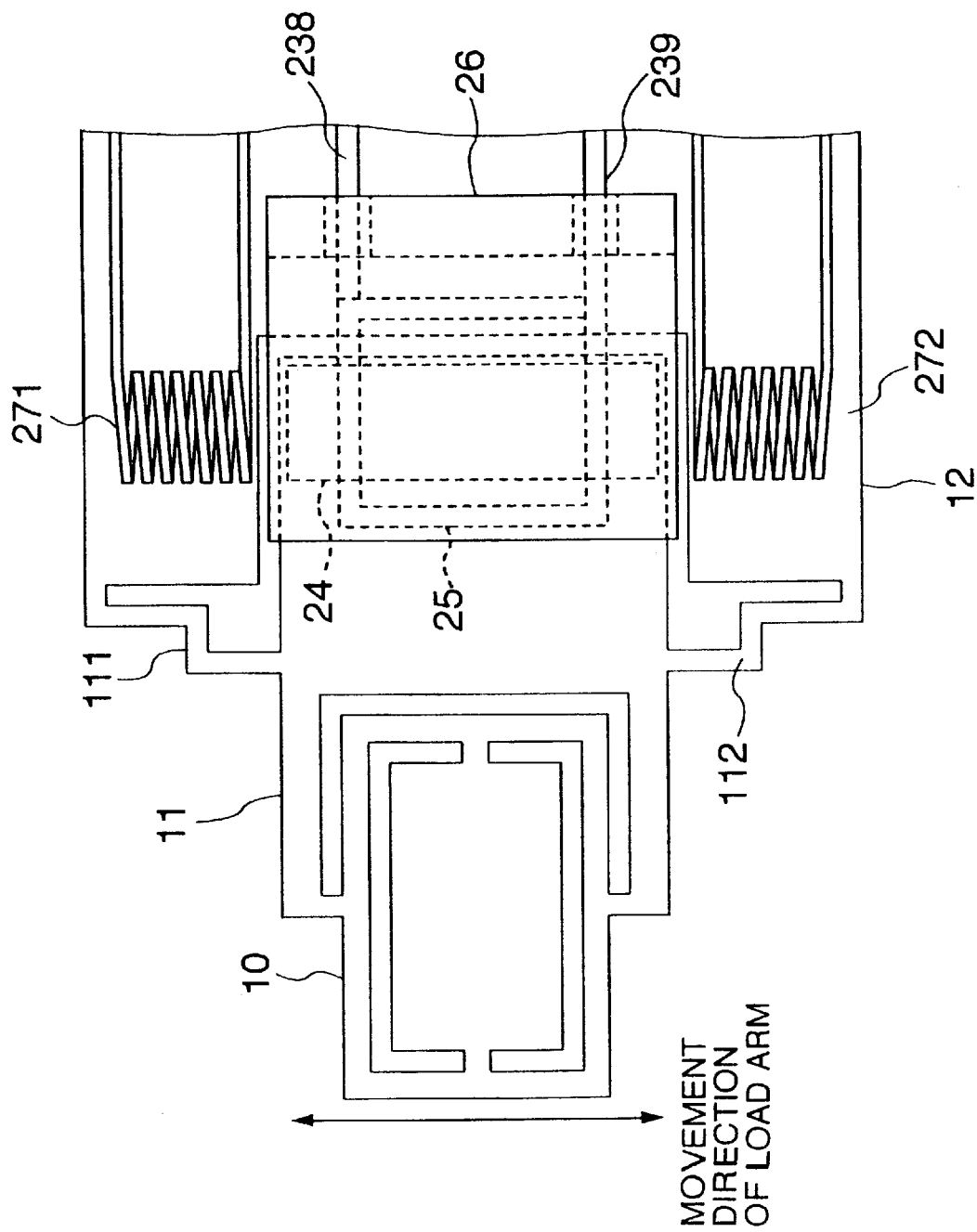

ROTATING DISK TYPE INFORMATION STORAGE APPARATUS HAVING A MOVABLE MEMBER INTEGRATED WITH A SUPPORT MEMBER

BACKGROUND OF THE INVENTION

1. Field of the Invention

The present invention relates to a rotating disk type information storage apparatus including a magnetic disk apparatus, an optical disk apparatus and the like. More specifically, it relates to a mechanism structure for use in a positioning, in a high accuracy, of a head which writes/reads information on a predetermined position on a rotating disk in which the information is to be stored.

2. Description of the Related Art

In general, a rotating disk type information storage apparatus such as a magnetic disk apparatus includes a rotating disk in which information is to be stored, heads which write/read the information in this disk and an actuator for positioning these heads on a predetermined position on the rotating disk.

As an example, a structure of the magnetic disk apparatus will be described with reference to FIGS. 16 and 17. FIG. 16 is a top view of the conventional magnetic disk apparatus. FIG. 17 is a cross sectional view taken along line XVII—XVII of the conventional magnetic disk apparatus shown in FIG. 16. The shown apparatus has a magnetic disk 15 which has a magnetic film on the face surface thereof as the rotating disk, magnetic heads 31, each having an electromagnetic transducing element as the head, and a voice coil motor 142 which includes a permanent magnet 140 and a coil 141 as the actuator. The magnetic heads 31 are fitted to sliders 30 which function so as to float the magnetic head over a recording surface of the magnetic disk 15. The sliders 30 are also fixed and supported by gimbal plates 10 formed in load arms 12 which function so as to support the sliders. The load arms 12 are fixed to a pivot shaft 13 which stands upright on a base plate 19. The load arms 12 are held so that they can be rotated about an axis of the pivot shaft 13 within the surface parallel to the recording surface of the magnetic disk 15, that is, within the surface perpendicular to the pivot shaft 13.

A bearing 17 is put between the pivot shaft 13 and the base plate 19 so that the pivot shaft 13 can be easily rotated with respect to the base plate 19. A spacer 18 is fixed to the pivot shaft 13 in such a manner that a plurality of fixed load arms do not collide with each other. The coil 141 is provided in the position opposite to the load arms 12 so as to put the pivot shaft 13 between the spacer 18 and the load arm 12. When an electric current flows into the coil 141, an electromagnetic force is applied to the coil from the permanent magnet 140 which is fixed on the base plate 19 so that the coil may be intervened in the permanent magnet 140. The coil is rotated about the pivot shaft 13 together with the pivot shaft 13 within the surface perpendicular to the pivot shaft 13. The coil 141 and the permanent magnet 140 constitute the voice coil motor 142. The rotation of the coil 141 also causes the rotation of the load arms 12 fixed to the pivot shaft 13 about the pivot shaft 13, so that they perform an operation so as to position the magnetic heads 31 fitted to the sliders 30 on a predetermined position on the magnetic disk 15. Typically, in case of the magnetic disk apparatus using the magnetic disk which is 3.5 in. or less in an outer diameter thereof, a DC power source having a voltage of 12 V or less is used as a driving power source for use in the positioning operation described herein.

A high recording density is greatly required for such a rotating disk type information storing apparatus. one method of meeting this requirement is to reduce an error in the positioning of the write/read head on the rotating disk and thereby storing the information in a narrower region. In the magnetic disk apparatus shown in FIGS. 16 and 17, the positioning operation of the magnetic head on a magnetic disk surface is accomplished by a first actuator which consists of the voice coil motor 142. However, an improvement of positioning accuracy is limited in this method. Another method of accomplishing the higher-accuracy positioning operation is to mount a second actuator for finely adjusting the position of the magnetic head on a position thereof near the magnetic head.

FIG. 18 shows the structure of the actuator for finely adjusting the position of the magnetic head disclosed in Japanese Patent Unexamined Publication No. 62-250570. FIG. 19 is a cross sectional view taken along line XIX—XIX of the actuator shown in FIG. 18. The slider 30 which functions so as to float the magnetic head 31 is provided with a cantilever which includes a partial slider and laminated piezoelectric elements 400, 401, 402, 403, 404, each having a main component of oxide constituted of lead, zirconium and titanium (lead zirconate titanate: PZT). The magnetic head 31 is fitted to a tip end of this beam on a free end side thereof. At both the ends of respective piezoelectric elements are formed electrodes 502, 503, 504, 505, 506, 507 for applying the voltage to the piezoelectric elements. The electrodes 502, 504 and 506 are connected to an electrode 500. The electrodes 503, 505 and 507 are connected to an electrode 501. An application of the voltage to the electrodes 500 and 501 allows respective piezoelectric elements to be elastic. Thus, the cantilever comprising the piezoelectric elements and the partial slider is flexed. Therefore, the position of the magnetic head can be moved in a direction perpendicular to the axis of the cantilever beam. That is, this cantilever function of the actuator.

The actuator shown in FIGS. 18 and 19 is for positioning the magnetic head perpendicularly to a direction of movement of the load arm in a high accuracy. A change in an orientation of the piezoelectric elements and a part of the slider constituting the cantilever also allows the magnetic head to be relatively moved in a direction parallel to the direction of movement of the load arm shown in FIG. 16. The position of the magnetic head can be finely adjusted so that the error in the positioning provided by the voice coil motor may be corrected.

In such a manner, the use of the cantilever type actuator including the piezoelectric elements and a part of the slider permits the improvement of the positioning accuracy of the magnetic head. However, this actuator has three problems as described below.

A first problem is that a driving voltage is high. In case of the cantilever type actuator using the piezoelectric elements, in order to obtain the displacement of 1 $\mu$m a high voltage is required as approaches scores of volts to 100 volts. However, as described above, in the magnetic disk apparatus using the magnetic disk having an outer diameter of 3.5 in. or less, the DC power source whose maximum voltage is 12 V is used so as to drive the voice coil motor for the positioning. Thus, in order to correct the positioning error of the order of 1 $\mu$m caused by a positioning mechanism by the voice coil motor, another power source for the high voltage must be prepared. This is disadvantageous for a miniaturization and a cost reduction of the magnetic disk apparatus.

A second problem is that the magnetic head is vibrated during the positioning performed by the load arm. The magnetic head is mounted to the tip end on the free end side of the cantilever type actuator. Thus, when the load arm is moved with an acceleration by the positioning operation made by the voice coil motor, the force is applied to the tip end of the cantilever in a direction parallel to that of movement of the load arm. The force causes a vibration of the magnetic head. Since it takes a long time to stop the vibration, a necessary time becomes relatively longer for the positioning of the magnetic head on a predetermined position with high accuracy. This makes a problem large with respect to an increase of an information writing speed and an information reading speed of the magnetic disk apparatus.

A third problem is that a machining thereof is very difficult since a plurality of piezoelectric elements and electrodes must be fixed to one part of the slider having a length of 1 mm to a few mm. The actuator shown in FIG. 18 cannot be processed in a step of sequentially laminating piezoelectric films and electrode films on the surface of the slider. Thus, a member including a plurality of fine piezoelectric elements and electrodes of 1 mm or less in length is first formed. The member is then required to be fixed to a beam-shaped portion formed on the slider. Such a machining is far more complex than the process of laminating the films on a substrate for use in a semiconductor element or the like. This process is not suitable to a mass production. This makes a problem large as to the improvement of production efficiency of the actuator.

SUMMARY OF THE INVENTION

The present invention is made in view of these problems. It is an object of the present invention to provide a rotating disk type information storage apparatus such as a magnetic disk apparatus which includes an actuator for a high-accuracy positioning which requires a lower driving voltage, has less vibration of a head caused by a movement of a support member for supporting the read/write head and can be manufactured in the substantially same process as that of manufacturing a semiconductor device, and the rotating disk type information storage apparatus which can achieve a high recording density at a low cost by using this actuator, is of a small size and can read/write information at a high speed.

According to a first aspect of the present invention for achieving the above object, there is provided a rotating disk type information storage apparatus having a rotating disk for storing information therein, a head for writing/reading the information in the rotating disk, a support member for supporting the head and a first actuator for moving the support member to a predetermined position on the rotating disk, the rotating disk type information storage apparatus which has a second actuator including a movable member and a driving force generating member, the movable member being supported by the support member and being capable of rotating about an axis perpendicular to a recording surface of the rotating disk, the driving force generating member rotating the movable member about the vertical axis, wherein the movable member is integrated with the support member; the head is mounted to the movable member; and the center of gravity of total weight of the movable member and all the members mounted to the movable member generally coincides with the center of rotation of the movable member.

According to a second aspect of the present invention for achieving the above object, the rotating disk type information storage apparatus described in a preamble of the first aspect includes a second actuator including a movable member and a driving force generating member, the movable member being supported by the support member and being capable of rotating about an axis perpendicular to a recording surface of the rotating disk, the driving force generating member rotating the movable member about the vertical axis, wherein the movable member is supported by the support member by a plurality of elastically deformable movable member supporting springs; the support member, all of the movable member and the movable member supporting springs are integrated with one another; the head is mounted to the movable member; and the center of gravity of total weight of the movable member and all the members mounted to the movable member generally coincides with the center of rotation of the movable member.

According to third aspect of the present invention for achieving the above object, the rotating disk type information storage apparatus described in the preamble of the first aspect includes a second actuator including a movable member and a driving force generating member, the movable member being supported by the support member and being capable of rotating about an axis perpendicular to a recording surface of the rotating disk, the driving force generating member rotating the movable member about the vertical axis, wherein the movable member is supported by the support member by a single hinge mechanism section; all of the support member, the movable member and the hinge mechanism section are integrated with one another; the head is mounted to the movable member; and the center of gravity of total weight of the movable member and all the members mounted to the movable member generally coincides with the position of the hinge mechanism section.

According to a fourth aspect of the present invention for achieving the above object, the rotating disk type information storage apparatus described in the preamble of the first aspect includes a second actuator including a movable member and a driving force generating member, the movable member being supported by the support member and being capable of rotating about an axis perpendicular to a recording surface of the rotating disk, the driving force generating member rotating the movable member about the vertical axis, wherein the movable member is integrated with the support member; the head is mounted to the movable member; and the head and the driving force generating member are opposite to each other about the center of rotation of the movable member.

According to a fifth aspect of the present invention for achieving the above object, in any one of the first aspect through the fourth aspect, the driving force generating member includes a soft magnetic member having a soft magnetic material located on the movable member, and a yoke having a coil and the soft magnetic material located on the support member.

According to a sixth aspect of the present invention for achieving the above object, in any one of the first aspect through the fourth aspect, the driving force generating member includes a permanent magnet having the soft magnetic material located on the movable member; and a yoke having the coil and the soft magnetic material located on the support member or on an upper yoke fixing member fixed to the support member.

According to a seventh aspect of the present invention for achieving the above object, the rotating disk type information storage apparatus described in the preamble of the first aspect includes a second actuator including a movable member and a driving force generating member, the movable member being supported by the support member and being capable of rotating about an axis perpendicular to a recording surface of the rotating disk, the driving force generating member rotating the movable member about the vertical axis, wherein the head is mounted to the movable member; and a sensor for detecting the position of the movable member with respect to the support member is disposed on the support member, on the movable member or on both of the support member and the movable member.

According to an eighth aspect of the present invention for achieving the above object, the rotating disk type information storage apparatus described in the preamble of the first aspect includes a second actuator including a movable member and a driving force generating member, the movable member being supported by the support member and being capable of rotating about an axis perpendicular to a recording surface of the rotating disk, the driving force generating member rotating the movable member about the vertical axis, wherein the head is mounted to the movable member; and the driving force generating member has a pair of electrodes which are opposite to each other on the support member and the movable member.

According to a ninth aspect of the present invention for achieving the above object, the rotating disk type information storing apparatus described in the preamble of the first aspect includes a second actuator including a movable member and a driving force generating member, the movable member being supported by the support member and being capable of rotating about an axis perpendicular to a recording surface of the rotating disk, the driving force generating member rotating the movable member about the vertical axis, wherein the head is mounted to the movable member; the driving force generating member has a permanent magnet including a hard magnetic material located on the movable member or on the support member and magnetic field generating means located in the position opposite to the permanent magnet located on the support member or on the movable member.

According to a tenth aspect of the present invention for achieving the above object, in the rotating disk type information storage apparatus described in the preamble of the first aspect, there is provided a support member for the rotating disk type information storage apparatus, wherein the movable member is integrated with the support member, the movable member being supported by the support member and being capable of rotating about an axis perpendicular to a recording surface of the rotating disk; and the head is mounted to the movable member.

According to an eleventh aspect of the present invention for achieving the above object, there is provided a magnetic disk apparatus including a magnetic disk having a magnetic medium for storing information therein, a magnetic head for writing/reading the information in the magnetic disk, a slider which the magnetic head is mounted to and which floats the magnetic head over the magnetic disk, a load arm for supporting the slider and a first actuator for moving the load arm to a predetermined position on the magnetic disk, the magnetic disk apparatus which includes a second actuator including a movable member and a driving force generating member, the movable member being supported by the load arm and being capable of rotating about an axis perpendicular to a recording surface of the magnetic disk, the driving force generating member rotating the movable member about the vertical axis, wherein the movable member is integrated with the load arm; the slider is mounted to the movable member; and the center of gravity of total weight of the movable member and all the members mounted to the movable member generally coincides with the center of rotation of the movable member.

According to a twelfth aspect of the present invention for achieving the above object, the magnetic disk apparatus described in the preamble of the eleventh aspect includes a second actuator disposed between the slider and the load arm, the second actuator including a movable member and a driving force generating member, the movable member being capable of rotating about an axis perpendicular to a recording surface of the magnetic disk, the driving force generating member rotating the movable member about the vertical axis, wherein the slider is mounted to the movable member; and the center of gravity of total weight of the movable member and all the members mounted to the movable member generally coincides with the center of rotation of the movable member.

According to a thirteenth aspect of the present invention for achieving the above object, the magnetic disk apparatus described in the preamble of the eleventh aspect includes a second actuator disposed between the slider and the load arm, the second actuator including a movable member and a driving force generating member, the movable member being capable of rotating about an axis perpendicular to a recording surface of the magnetic disk, the driving force generating member rotating the movable member about the vertical axis, wherein the slider is mounted to the movable member; and a sensor for detecting the position of the movable member with respect to the load arm is disposed on the second actuator.

In order to furthermore achieve the above object, according to any one of the first aspect through the fourth aspect, the support member has a main component of any one of silicon, silicon oxide, stainless steel, nickel, compound of iron and nickel and copper, there is provided a method of manufacturing the support member which includes any one of the steps of storage the silicon and the silicon oxide by etching; growing the copper, the nickel, the stainless steel or the compound of iron and nickel by a plating process; or storage a foil containing the copper, the nickel, the stainless steel or the compound of iron and nickel by etching or pressing.

BRIEF DESCRIPTION OF THE DRAWINGS

FIG. 4 is a plan view showing a portion of the magnetic disk apparatus according to the first embodiment of the present invention;

FIG. 6 is a plan view of the load arm mounted in the magnetic disk apparatus according to a second embodiment of the present invention;

FIG. 7 is a plan view of the load arm mounted in the magnetic disk apparatus according to a third embodiment of the present invention;

FIG. 8 is a plan view of the load arm mounted in the magnetic disk apparatus according to a fourth embodiment of the present invention;

FIG. 9 is a plan view of the load arm mounted in the magnetic disk apparatus according to a fifth embodiment of the present invention;

FIG. 12 is a plan view of the load arm mounted in the magnetic disk apparatus according to a sixth embodiment of the present invention;

DETAILED DESCRIPTION OF THE PREFERRED EMBODIMENTS

Figure 16:
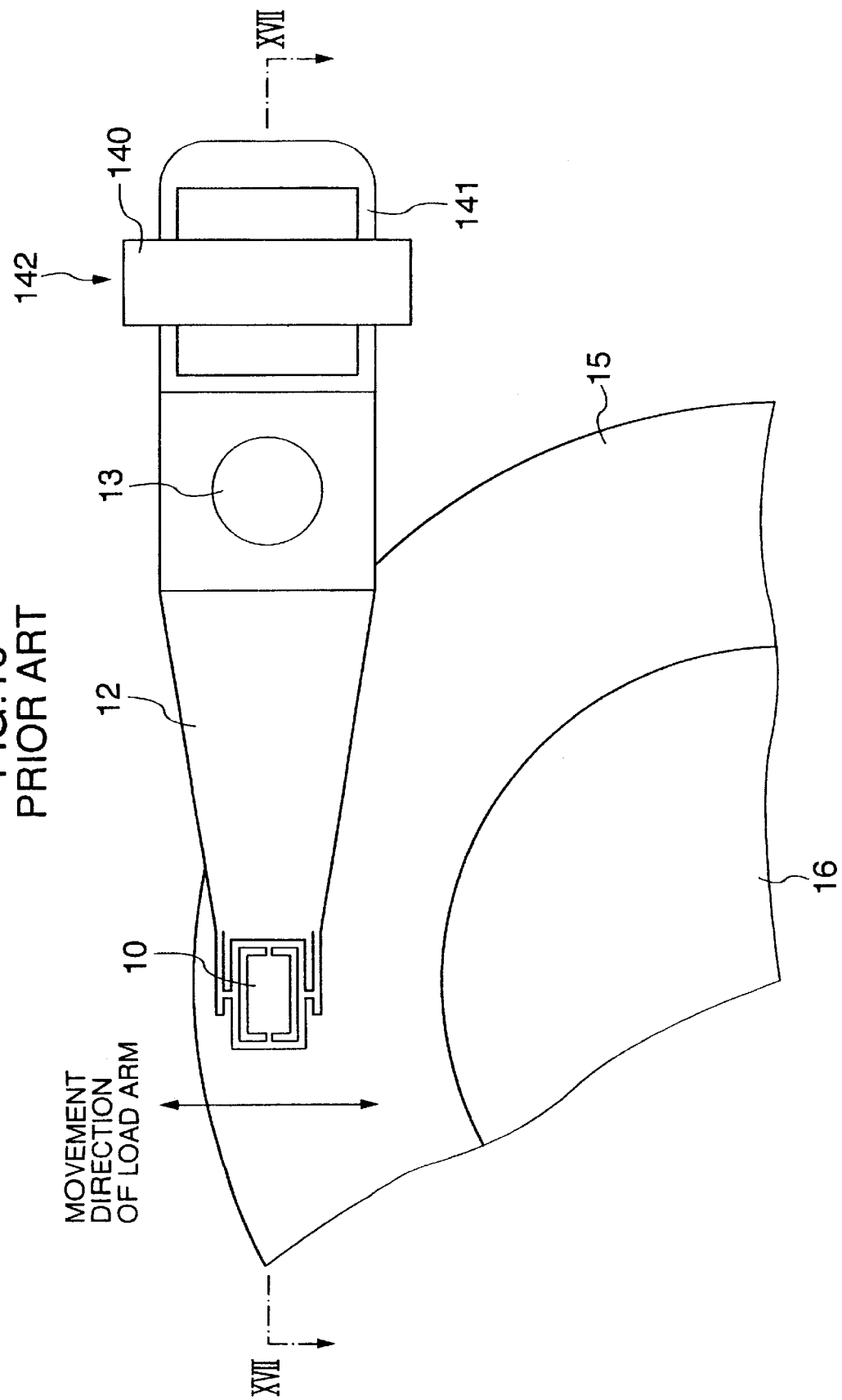
FIG. 16 is a plan view of the conventional magnetic disk apparatus.
Figure 17:
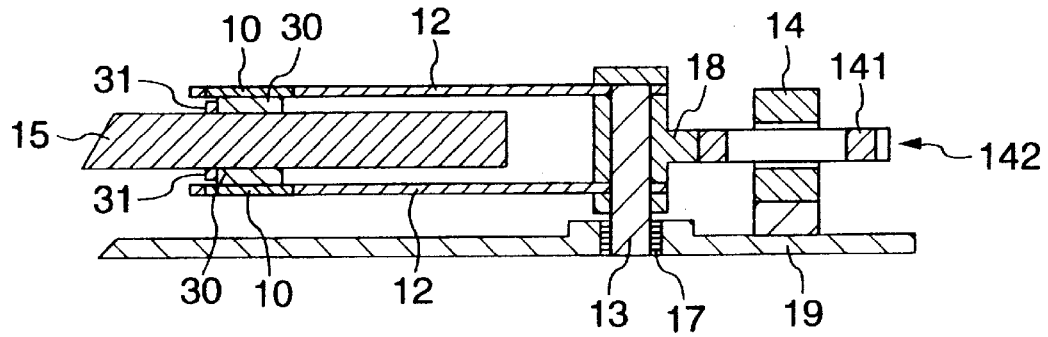
FIG. 17 is a cross sectional view taken along line XVI—XVI of the prior art magnetic disk apparatus.
Figure 18:
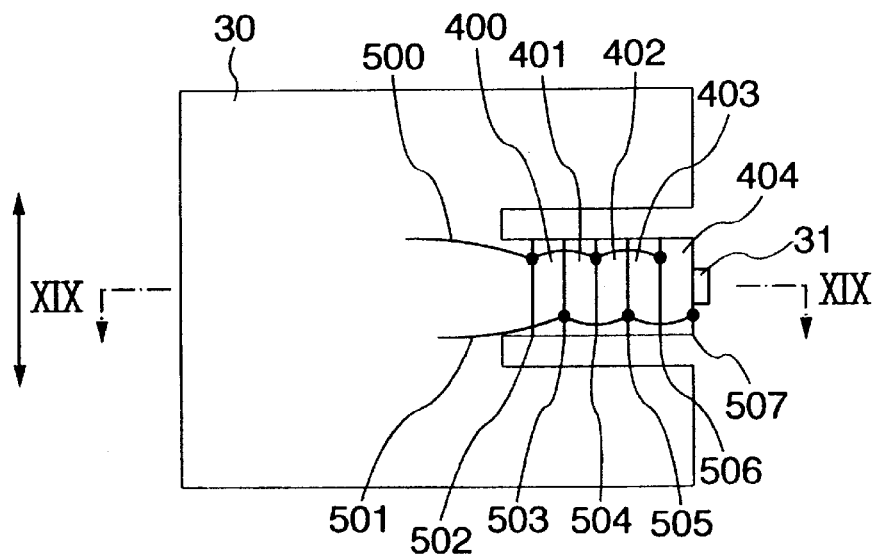
FIG. 18 is a plan view of an actuator for finely adjusting a positioning and mounted in the conventional magnetic disk apparatus.
Figure 19:
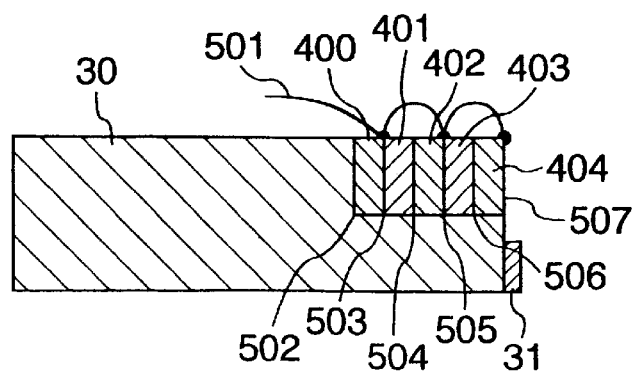
FIG. 19 is a cross sectional view taken along line XIX—XIX of the actuator for finely adjusting the positioning as shown in FIG. 18.

Embodiments of the present invention will be described below with reference to the accompanying drawings. Each embodiment described below has the same structure as the prior art described above with reference to FIGS. 16 and 17 except for a portion from a load arm to a magnetic head. Accordingly, the description of its same structure is omitted.

Figure 1:
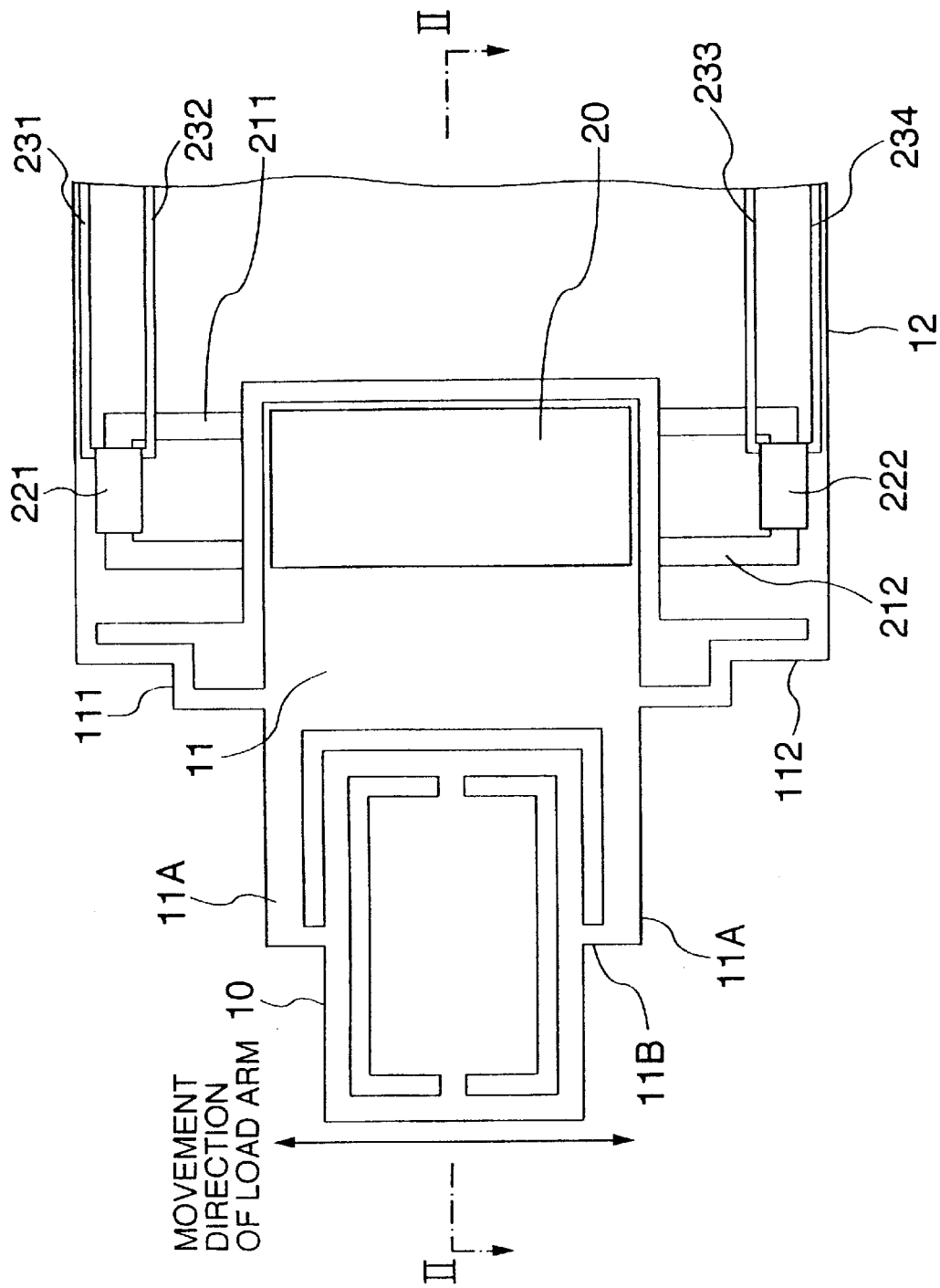
FIG. 1 is a plan view of a load arm mounted in a magnetic disk apparatus according to a first embodiment of the present invention.
Figure 2:
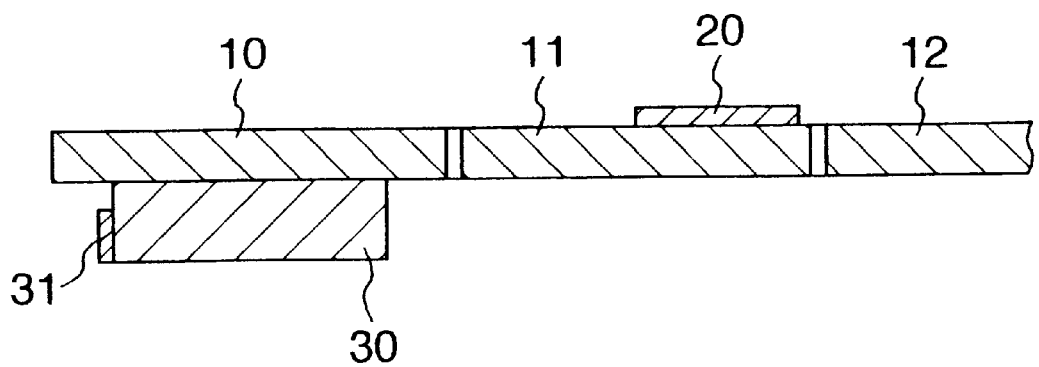
FIG. 2 is a cross sectional view taken along line II—II of the load arm shown in FIG. 1.

FIG. 1 is a plan view showing a structure of an end on the side of the magnetic head of a load arm 12 mounted in a magnetic disk apparatus according to a first embodiment of the present invention. FIG. 2 is a cross-sectional view taken along line II—II of the load arm shown in FIG. 1.

Referring now to FIGS. 1 and 2, the structure of the load arm, which is a feature of the magnetic disk apparatus of the embodiment, will be described as follows. In the magnetic disk apparatus, the load arm 12 is a support member for supporting a magnetic head 31 which writes/reads information. The magnetic head 31 is attached to a slider 30 which functions so as to float the magnetic head over the magnetic disk in which the information is to be stored. The slider 30 is fixed to a gimbal plate 10. On a tip end of the load arm 12 is arranged a plate-shaped substantially rectangular movable member 11 which is supported by movable member supporting springs 111, 112. The similarly rectangular gimbal plate 10 is supported by the movable member 11. As shown in FIG. 2, the load arm 12, the movable member 11 and the gimbal plate 10 are arranged so that they may be aligned in sequence while their long axes match one another within substantially the same surface. In this case, the long axes of the load arm 12, the movable member 11 and the gimbal plate 10 do not always have to match one another.

The gimbal plate 10 is arranged so that it may be opposite to the load arm 12 with the movable member 11 between. Both of the gimbal plate 10 and the movable member 11 are integrated with the load arm 12. The movable member supporting springs 111, 112 are protruded parallel to the axis of the load arm 12 on both the sides of the tip end of the load arm 12. The movable member supporting springs 111, 112 are bent in zigzag shape in opposite directions. The movable member supporting springs 111, 112 are integrally connected onto the side surface of the movable member 11. At a center of the tip end of the load arm 12 is formed a concavity which is cut off in rectangular shape as seen from a plan view. The portion on the side of the load arm 12 of the movable member 11 is fitted in the concavity with a predetermined space. At the center of the end opposite to the load arm 12 of the movable member 11 is also formed the concavity which is cut off in rectangular shape as seen from the plan view. The portion on the side of the movable member 11 of the gimbal plate 10 is fitted in the concavity with a predetermined space. Protrusions 11B are formed within tip ends 11A on both the sides of the concavity on the end on the side of the gimbal plate 10 of the movable member 11 so that the protrusions 11B may be directed to the axis. The protrusions are integrally connected onto the side surface of the gimbal plate 10 so as to support the gimbal plate 10.

In the embodiment, the gimbal plate 10 is arranged on one end of the movable member 11. A film 20 made of a soft magnetic material is formed on the surface on the other end (the end near the load arm 12, that is, the portion which is fitted in the concavity of the load arm 12) of the movable member 11. U-shaped yokes 211 and 212, which are similarly made of the soft magnetic material, are formed in the position opposite to the end perpendicular to the axis of the soft magnetic film 20 on the load arm 12. Coils 221 and 222 are formed in the yokes 211 and 212, respectively. Electrodes 231 and 232 located on the load arm 12 are connected to the coil 221. Electrodes 233 and 234 located on the load arm 12 are connected to the coil 222.

Both the movable member supporting springs 111 and 112 are arranged so that a spring constant parallel to the direction of movement of the load arm may be larger than the spring constant perpendicular to that direction. An electric current is applied to the electrodes 231, 232 of the coil 221 and the electrodes 233, 234 of the coil 222 so that a magnetic attraction force is generated between the yokes 211, 212 and the soft magnetic film 20 on the movable member 11. The magnetic attraction force allows the movable member 11 to be rotated within the surface parallel to the surface of FIG. 1 with respect to the load arm 12. The surface of the movable member 11 is generally parallel to a recording surface of a magnetic disk 15. Thus, the rotation of the movable member 11 is made about a line substantially perpendicular to the recording surface of the magnetic disk 15 as an axis of rotation. The movable member 11 and a driving force generating member including the yokes 211, 212, the coils 221, 222 and the soft magnetic film 20 constitutes a second actuator for positioning the magnetic head to be described in an operation principle of the embodiment.

Figure 3:
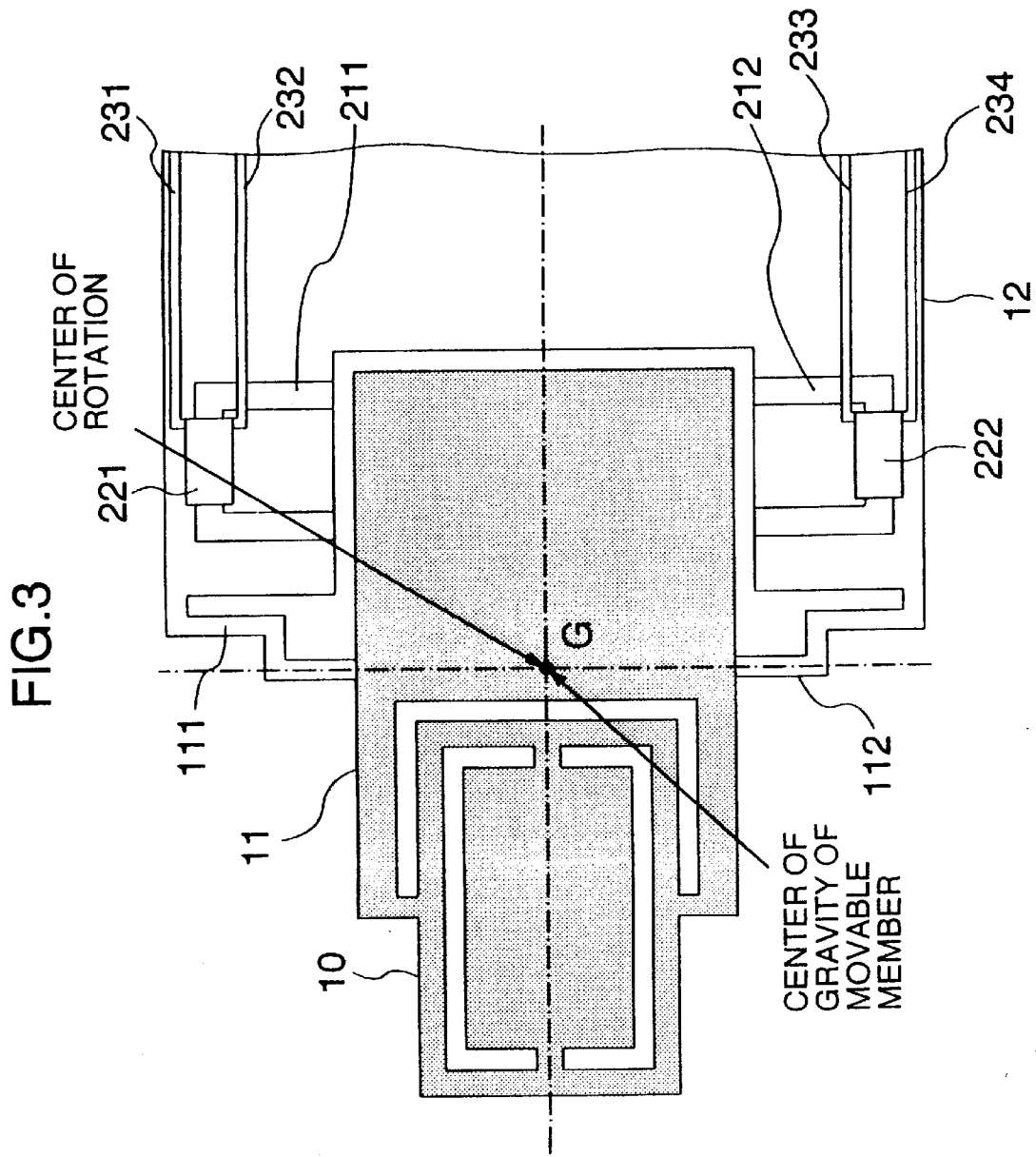
FIG. 3 is a plan view showing a center of rotation of a movable member in the load arm mounted in the magnetic disk apparatus according to the first embodiment of the present invention.

FIG. 3 is a plan view for geometrically describing the movement of the movable member 11 in the embodiment. In FIG. 3, the hatched portion represents the movable member 11 supported on the load arm 12 by the movable member supporting springs 111 and 112. As described above, the gimbal plate 10 is arranged on one end of the movable member 11. The soft magnetic film 20 is fixed to the other end of the movable member 11. The slider 30, to which the magnetic head 31 is mounted, is fixed on a back surface of the gimbal plate 10 (where the surface, on which the soft magnetic film 20 is formed, is defined as a face surface). Accordingly, to the movable member 11 are mounted the gimbal plate 10, the soft magnetic film 20, the slider 30 and the magnetic head 31. The magnetic attraction force allows all of these members to be rotated with respect to the load arm 12. In FIG. 3, a point G denotes a center of gravity of the whole movable member including components mounted to the movable member 11.

On the other hand, the movable member 11 is supported to the load arm 12 by the movable member supporting springs 111 and 112. Due to anisotropy of the spring constants of the movable member supporting springs described above, the magnetic attraction force is applied to the movable member 11 from the yokes and the coils fixed on the load arm. At that time, the movable member 11 is rotated about an intersection of a line which connects the movable member supporting springs to each other (a vertical one-dot-dash line in FIG. 3, that is, the line which connects support points of the movable member supporting springs 111 and 112 to each other) and a center line of the movable member (a horizontal one-dot-dash line in FIG. 3, that is, the axis of the movable member 11). In the present invention, the point G, which is the center of gravity of the whole movable member, is allowed to coincide with the center of rotation. Thus, even if an inertia force is applied to the movable member 11 due to an acceleration of the load arm 12 in an actuation by a voice coil motor of the load arm 12, a vibration can be avoided which is caused by an inconsistency between the center of gravity of the movable members and the center of rotation thereof.

A method of manufacturing the load arm for use in the magnetic disk apparatus of this embodiment will be described below. The load arm 12 for use in the embodiment is manufactured in the following manner. In the first place, a thin stainless plate is etched. The structure of the gimbal plate 10, the movable member 11 and the supporting springs 111, 112 is then integrally formed. Next, a soft magnetic foil, which contains a compound of iron and nickel, is formed as the soft magnetic film 20. By the use of an adhesive, the soft magnetic film 20 is adhered to the position opposite to the position where the gimbal plate 10 is formed on the movable member 11. The soft magnetic yokes 211, 212 are formed so that they may be constituted of the compound of iron and nickel. The coils 221, 222 are formed so that many copper coated wires may be wound around the coils. By the use of the adhesive, the yokes 211, 212 and the coils 221, 222 are then adhered to the position opposite to the soft magnetic film 20 on the load arm 12. The slider 30, to which the magnetic head 31 is fixed, is finally adhered on the back surface of the gimbal plate 10 by the use of the adhesive. The load arm for use in the magnetic disk apparatus of the embodiment is manufactured in such a manner.

In the embodiment, a formation of the load arm 12 is accomplished by etching the thin stainless plate. The formation may be accomplished by etching a silicon wafer. Alternatively, a pattern is formed on a metallic substrate by a photoresist. A copper plated film is then grown in the pattern. Finally, the photoresist and the metallic substrate are dissolved by solvent and etching solution, respectively.

In the embodiment, the foil of the compound of iron and nickel is used as the soft magnetic film 20. Alternatively, the compound of iron and nickel or a thin nickel film may be formed directly on the load arm 12 by a sputtering method or a vacuum depositing method. The yokes 211, 212 and the coils 221, 222 may be formed in a similar manner. That is, an insulating film, a first layer electrode as the coil, a first interlaminar insulating film, a soft magnetic film as the yoke, a second interlaminar insulating film and a second layer electrode as the coil are laminated in sequence on the load arm so that the yokes and the coils may have a monolithic type structure.

In the embodiment, the structure of the load arm of the magnetic disk apparatus is described above. Needless to say, this structure may be also applied to a support section of the head of an optical disk apparatus.

Figure 5:
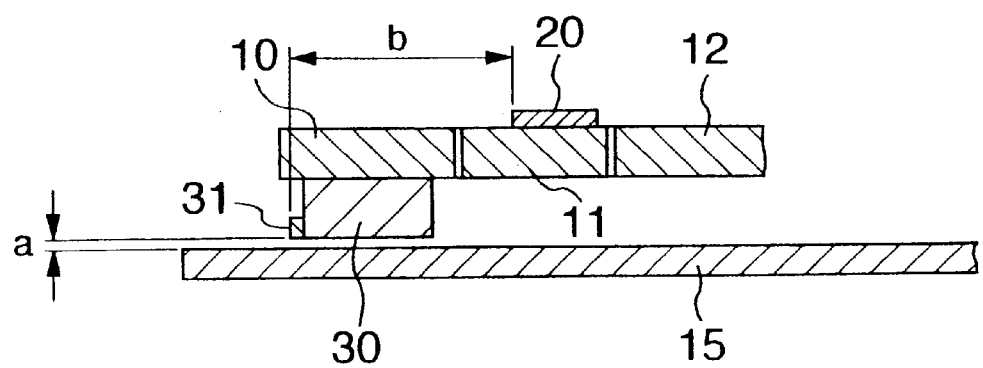
FIG. 5 is a cross sectional view taken along line V—V of the magnetic disk apparatus shown in FIG. 4.

FIG. 4 is a plan view showing the whole magnetic disk apparatus of the first embodiment of the present invention. FIG. 5 is a cross sectional view taken along line V—V of the whole magnetic disk apparatus shown in FIG. 4. The basic structure of the magnetic disk apparatus according to this embodiment is similar to the structure of the conventional magnetic disk apparatus shown in FIGS. 16 and 17. The magnetic disk apparatus includes the magnetic disk 15 the surface of which the magnetic film is formed on and which the information is stored in, the magnetic head 31 which has an electromagnetic transducing element for reading/writing the information, the slider 30 for floating the magnetic head fitted thereto over the magnetic disk, the load arm 12 for supporting the slider and the voice coil motor 142 for positioning the load arm 12 on a predetermined position on the magnetic disk 15. The load arm 12 is integrally formed with the gimbal plate 10, the movable member 11, the movable member supporting springs 111, 112, the yokes 211, 212 and the coils 221, 222. The magnetic disk 15 is rotated by a spindle motor 16. The load arm 12 is fixed by a pivot shaft 13 and is held so that it may be rotated with respect to a base plate (not shown in FIGS. 4 and 5). A coil 141 is fixed on the load arm 12. The voice coil motor 142 comprises a pair of the coil 141 and a permanent magnet 140 fixed on the base plate.

The positioning operation principle in the magnetic disk apparatus of the embodiment will be described below.

The magnetic head 31 fixed to the slider 30 is floated over the recording surface of the magnetic disk 15 by the slider 30, while the load arm 12 is moved (the rotation about the pivot shaft 13) by the voice coil motor 142 which is a first actuator. In such a manner, the magnetic head 31 is positioned on a predetermined position on the magnetic disk 15. However, as described above, the positioning accuracy by the voice coil motor 142 is limited. An error is produced between a target position and an actual position. An amount of this error is detected so as to determine an amount of movement necessary for a correction. The current is allowed to flow into the coil 221 or 222 in accordance with an amount of correction.

For example, when the current passes through the coil 221 by the use of the electrodes 231 and 232, the magnetic attraction force acts between the yoke 211 and the soft magnetic film 20. Therefore, the soft magnetic film 20 is attracted to the yoke 211. At this time, the spring constant of the movable member supporting spring which supports the movable member 11 is larger in the direction parallel to the direction of movement of the load arm. On the other hand, the spring constant is smaller in the direction perpendicular to the direction of movement of the load arm. Thus, the whole movable member is not moved parallel to the yoke 211, but is rotated counterclockwise with respect to the load arm. At this time, the center of rotation is described above with reference to FIG. 3. The movable member 11 is rotated counterclockwise about the axis which is perpendicular to the recording surface of the magnetic disk 15 and passes the center of gravity G with respect to the load arm 12. Thus, the slider 30 fixed on the gimbal plate 10 in the movable member 11 is also rotated counterclockwise. The magnetic head 31 fitted to the slider 30 is rotated with respect to the load arm 12. In this case, the amount of movement of the magnetic head 31 is determined by a value of the current which passes through the coil 221 or 222, the number of wire turns of the coil, the spring constant of the movable member supporting spring or the like. Accordingly, the error is detected between the actual position positioned by the voice coil motor 142 and the target position. The current is allowed to flow into the coil 221 and/or 222 in accordance with that value. This allows the magnetic head 31 to be positioned on the target position. In such a manner, the yokes 211, 212, the coils 221, 222 and the soft magnetic film 20 function as the driving force generating member. A combination of these members and the movable member 11 constitutes the second actuator for positioning the magnetic head 31 with high accuracy.

Finally, effects of the magnetic disk apparatus described in the embodiment will be described.

In the first place, in the second actuator having the most important function in the embodiment, the movable member 11 can be integrally formed with the load arm 12. Therefore, a complex step such as an assembly is not used at all, while the movable member 11 can be manufactured in the entirely same manner as a process of the conventional load arm. Furthermore, in the driving force generating member including the yokes, the coils and the soft magnetic film, all the components can be surface-packaged on the load arm 12. Therefore, this structure has very excellent mass productivity. The yokes 211, 212, the coils 221, 222 and the soft magnetic film 20 can be manufactured by, in stead of the use of the surface-packaged components, laminating the films directly on the load arm by means of the sputtering method and the vacuum depositing method as described in the manufacturing method. In such a manner, the driving force generating member can be also manufactured without the assembly step.

As described above, the center of gravity of the movable member 11 and the whole movable member 11 is allowed to coincide with the center of rotation of the movable member 11 which is rotated with respect to the load arm 12, where the whole movable member 11 includes all of the gimbal plate 10, the slider 30, the magnetic head 31 and the soft magnetic film 20 which move together with the movable member 11. Thus, even if the load arm 12 is accelerating moved by the positioning operation and thereby the inertia force acts on the movable member 11 at the tip end of the load arm 12, the movable member 11 is not vibrated at all. Accordingly, the magnetic head 31 can be positioned on a predetermined position at very high speed.

Furthermore, the large magnetic attraction force can be generated even at a low voltage. Thus, in order to correct the error of the order of 1 mm caused in a positioning mechanism by the voice coil motor 142, a DC power source of about 5 V is sufficient. The power source mounted in the magnetic disk apparatus can be used as it is.

As apparent from the above description, the magnetic disk apparatus of the embodiment achieves such effects that (1) the apparatus can be manufactured in substantially the same manner as the method of manufacturing the conventional magnetic disk apparatus; (2) the apparatus can accomplish the high-speed positioning since the magnetic head 31 is vibrated even during the movement of the load arm 12; and (3) the apparatus can readily improve the positioning accuracy since it has the magnetic head positioning mechanism which can be driven at as low a voltage as about 5 V, thereby allowing a high recording density to be achieved.

It seems that a problem of the embodiment is that a magnetic force generated by the coil for use in the driving force generating member has an adverse effect on the magnetic head 31 thereby resulting in a generation of noise of the write/read of the information. However, as shown in FIG. 5, a distance b between the driving force generating member and the magnetic head is still larger than a space a between the magnetic head 31 and the magnetic disk 15. The space a is in the order of 50 nm, while the distance b is in the order of 1 mm. A magnitude of the magnetic force becomes smaller in inverse proportion to the square of the distance. Therefore, the driving force generating member has about $10^{-19}$ times effect on the write/read, compared to the magnetic head 31. Even in consideration of a difference between the magnetic force of the magnetic head 31 and the magnetic force of the driving force generating member, the aforementioned value means that the magnetic force generated by the driving force generating member has almost negligible effect on the write/read. It is understood that there is no problem about the noise caused due to the driving force generating member.

FIG. 6 is a plan view of the load arm 12 mounted in the magnetic disk apparatus according to a second embodiment of the present invention. The difference between the second embodiment and the first embodiment is that the movable member 11 of the second embodiment is supported to the load arm 12 by three movable member supporting springs 111, 112 and 113. The structures of the gimbal plate 10, the soft magnetic film 20, the yokes 211, 212, the coils 221, 222 and the electrodes 231, 232, 233, 234 are quite the same as those of the first embodiment. Characteristics of the movable member supporting spring are described below. As regards the movable member supporting springs 111 and 112, the spring constant parallel to the direction of movement of the load arm is larger than the vertical spring constant in the same manner as the first embodiment. On the other hand, the movable member supporting spring 113 is arranged on the axis of the movable member 11 so as to connect the movable member 11 and the load arm 12 to each other. In case of the movable member supporting spring 113, the spring constant parallel to the direction of movement of the load arm is smaller than the vertical spring constant.

In this case, the second embodiment has the same properties as that of the first embodiment, that is, the properties are that the movable member 11 is rotated within the surface substantially parallel to the recording surface of the magnetic disk 15 (within the surface parallel to the surface of FIG. 6) with respect to the load arm 12. However, the opposite side (the side near the load arm 12) of the gimbal plate 10 of the movable member 11 is supported by the movable member supporting spring 113. Therefore, it is possible to reduce a deviation of the position of the movable member 11 in the direction perpendicular to the surface of the drawing, compared to the first embodiment. That is, in the second embodiment, the movable member supporting spring 113 is added to the second actuator of the first embodiment so as to form the second actuator. Thus, the operation of the second actuator for positioning the magnetic head can be further stabilized.

Of course, such a load arm can be easily manufactured by etching the stainless in quite the same manner as the first embodiment.

FIG. 7 is a plan view of the load arm mounted in the magnetic disk apparatus according to a third embodiment of the present invention. The difference between the third and second embodiments is as follows. Firstly, the space is widened between the portion which forms a bottom side of the concavity on the tip end of the load arm 12 and the side of the movable member 11 opposite to the bottom side, and the movable member supporting spring 113 described in the second embodiment is coupled to the movable member 11 through a comb teeth shaped member 123. Secondly, similar comb teeth shaped members 121 and 122 are disposed in the position opposite to the comb teeth shaped member 123 of the load arm 12 so that they may be engaged with the comb teeth shaped member 123. Thirdly, comb teeth shaped electrodes 235, 236 and 237 are disposed on the comb teeth shaped members 121, 122 and 123, respectively. The other structure is quite the same as the structure of the load arm described in the second embodiment. In the third embodiment, a sensor for detecting the position of the movable member 11 with respect to the load arm 12 is added to the second actuator of the second embodiment.

The actuator for positioning the head of the third embodiment is operated in the same manner as the preceding embodiments. That is, in the first place, the magnetic head 31 is moved near a predetermined position by the voice coil motor 142 which directly moves the load arm 12. Next, the error is detected between the final target position and the actual position. The current flows into the coils 221 and 222 so as to correct the error. The magnetic attraction force is then applied to the soft magnetic film 20 on the movable member 11 from the yokes 211, 212 and the coils 221, 222 on the load arm 12. The force allows the movable member to be rotated with respect to the load arm so that the position of the magnetic head 31 is positioned on the final target position with high accuracy.

It should be noted that it is necessary to correctly know the position of the movable member 11 with respect to the load arm 12 when such a positioning system is used. The reason is that the coil which the current should pass through for the positioning and the current value necessary for the positioning considerably differ depending on the position of the movable member 11 with respect to the load arm 12. In the magnetic disk apparatus described in the first and second embodiments, the position of the movable member 11 with respect to the load arm 12 is estimated from the value of the current which passes through the coils 221, 222 and the spring constants of the movable member supporting springs 111, 112, 113. In the third embodiment, the comb teeth shaped electrodes 235, 236 and 237 on the comb teeth shaped members 121, 122 and 123 are used as the sensor for detecting the position of the movable member 11 with respect to the load arm 12. That is, electrostatic capacity between the electrodes 235 and 237 and electrostatic capacity between the electrodes 236 and 237 are measured so as to directly detect the position of the movable member with respect to the load arm.

Of course, such a load arm can be easily manufactured by etching the stainless steel in quite the same manner as the first embodiment. Furthermore, the comb teeth shaped electrode on the comb teeth shaped member can manufactured directly on the comb teeth shaped member or on the insulating film formed on the comb teeth shaped member by the sputtering method or the vacuum depositing method. Therefore, the particular assembly step is not required, and the comb teeth shaped electrode can be manufactured.

By the use of such an apparatus, the position of the movable member with respect to the load arm can be rapidly obtained with high accuracy. Accordingly, the magnetic disk apparatus of the third embodiment is more advantageous for the improvement of high speed and high density than that of the first and second embodiments.

FIG. 8 is a plan view of the structure of the load arm mounted in the magnetic disk apparatus according to a fourth embodiment of the present invention. The difference between the first and fourth embodiments is as follows.

Firstly, in stead of the concavity at the center on the tip end of the load arm 12 of the second embodiment, two concavities are symmetrically disposed about the axis thereof on the tip end. Secondly, two protrusions 11E which are fitted in the two concavities with a predetermined space are disposed on the end of the movable member 11 on the side of the load arm 12. Thirdly, a bottom side 11C of the concavity formed between the two protrusions 11E is coupled, through a hinge mechanism section 114, to the tip end of a protrusion 12A formed between the two concavities of the load arm 12 so as to eliminate the movable member supporting springs 111, 112, 113. Fourthly, soft magnetic films 201 and 202 of the soft magnetic material are disposed on the surfaces of the two protrusions 11E, respectively. The tip end of the protrusion 12A is acutely angled as has a triangular shape. The tapered portion on the tip end is connected to the bottom side 11C. The movable member 11 can be rotated with reference to the protrusion 12A in this connection as if this connection formed the hinge. The yokes 211 and 212 are arranged on the load arms 12 opposite to the soft magnetic films 201 and 202, respectively. Since the other arrangement is the same as the first embodiment, the description thereof is omitted.

In the fourth embodiment, the second actuator for positioning the head is constituted by including the movable member 11, the soft magnetic films 201, 202, the yokes 211, 212, the coils 221, 222, the electrodes 231, 232, 233, 234 and the hinge mechanism section 114.

The movable member 11 is supported to the load arm 12 by the hinge mechanism section 114 which is the connection of the bottom side 11C and the tip end of the protrusion 12A. The movable member 11 can be rotated about the hinge mechanism section with respect to the load arm 12 within the surface parallel to the recording surface of the magnetic disk 15. The gimbal plate 10 is disposed on one end of the movable member 11. The soft magnetic films 201, 202 made of the soft magnetic material are formed on another end of the movable member 11. The slider 30, to which the magnetic head 31 is fitted, is fixed on the back surface of the gimbal plate 10 in the same manner as the embodiments described above. The yoke 211 made of the soft magnetic material, the coil 221 and the electrodes 231, 232 for flowing the current into the coil are arranged in the position opposite to the soft magnetic film 201 on the load arm 12. In the position opposite to the soft magnetic film 202 are arranged the yoke 212 of the soft magnetic material, the coil 222 and the electrodes 233, 234 for flowing the current into the coil. The center of gravity of the movable member 11 and all the members mounted in the movable member 11, that is, the gimbal plate 10, the magnetic head 31, the slider 30 and the soft magnetic films 201, 202 coincides with a position of the hinge mechanism section.

The method of manufacturing the load arm and the principle of positioning operation of the magnetic head in the fourth embodiment are the same as those of the first embodiment. In the load arm 12 of the fourth embodiment, the movable member supporting spring is replaced by the hinge mechanism section 114 so as to support the movable member 11. The effect of this structure will be simply described. As described in the first embodiment, the movable member supporting spring is constructed so that the spring constant parallel to the direction of movement of the load arm may be larger than the vertical spring constant. Thus, the movable member can be rotated with respect to the load arm. However, the spring constant parallel to the direction of movement of the load arm cannot be infinitely enlarged. Therefore, when the load arm is accelerating moved by the positioning operation, the movable member is slightly translated parallel to the direction of movement of the load arm. This component of the translation movement constitutes one factor in a deterioration of the magnetic head positioning accuracy. However, if the movable member 11 is supported by the hinge mechanism section 114 in the manner of the fourth embodiment, the component of the translation movement can be completely removed. Accordingly, it is made possible to position it with higher accuracy. of course, the center of gravity of the whole movable member coincides with the position of the hinge mechanism section 114, i.e., the center of rotation of the movable member. Therefore, as is the case with the first embodiment, even if the load arm 12 is accelerating moved by the positioning operation to thereby apply the inertia force to the movable member 11 at the tip end of the load arm 12, the movable member 11 is not vibrated at all.

Figure 10:
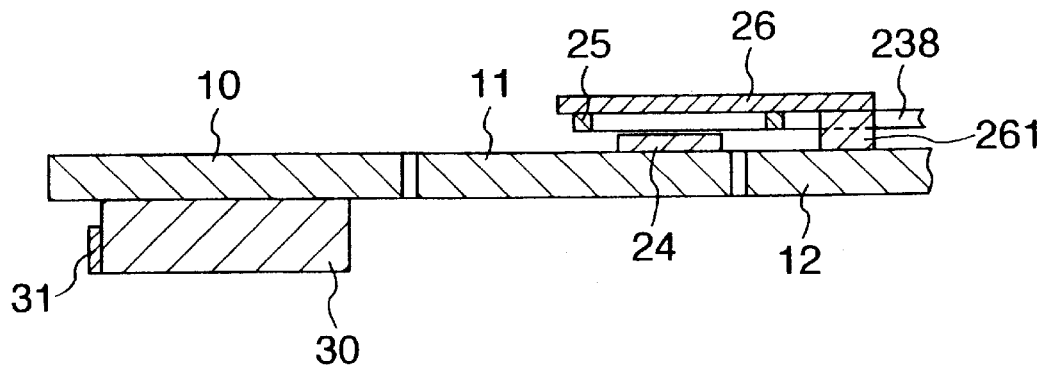
FIG. 10 is a cross sectional view taken along line X—X of the load arm shown in FIG. 9.

FIG. 9 is a plan view of the structure of the load arm mounted in the magnetic disk apparatus according to a fifth embodiment of the present invention. FIG. 10 is a cross sectional view taken along line X—X of this load arm. As described above, in the first embodiment, the soft magnetic film 20, the yokes 211, 212 and the coils 221, 222 are used as the driving force generating member so as to rotate the movable member by the use of the magnetic attraction force. The difference between the fifth and first embodiments is as follows. Firstly, in stead of the soft magnetic film 20, a flat-plate-shaped permanent magnet 24 is located in the same position as the driving force generating member. Secondly, an upper yoke 26, which a coil 25 is attached to, is disposed just over the permanent magnet 24. Thirdly, the upper yoke 26 is fixed and supported to the load arm 12 by an upper yoke fixing member 261. That is, the second actuator of the fifth embodiment includes the driving force generating member including the permanent magnet 24, the upper yoke 26 to which the coil 25 is attached and the upper yoke fixing member 261 for supporting/fixing the upper yoke 26 and the movable member 11. Since the other arrangement is the same as the first embodiment, the description thereof is omitted.

The coil 25 is arranged so that the axis thereof may be perpendicular to the surface of the flat plate of the permanent magnet 24. The movable member 11 is rotated by the use of a Lorentz force which acts between the coil 25 and the permanent magnet 24. The second actuator is constituted of these driving force generating members and the movable member 11. The movable member 11 is supported by the movable member supporting springs 111, 112 so that it can be rotated with respect to the load arm 12. In this case, the center of gravity of the whole movable member including the gimbal plate 10, the magnetic head 31 or the like coincides with the center of rotation of the movable member. The gimbal plate 10 is disposed on one end (the end far from the load arm 12) of the movable member. The slider 30, which the magnetic head 31 is mounted to, is fixed on the gimbal plate 10. The permanent magnet 24 is fixed in the position, where the soft magnetic film 20 is located in the first embodiment, on the face surface on another end of the movable member 11. The upper yoke 26, which the coil 25 is attached to, is fixed to the load arm by the upper yoke fixing member 261 so that it may be located just over the permanent magnet 24. In this case, a height of the upper yoke fixing member 261 is previously adjusted in such a manner that the permanent magnet 24 does not come into direct contact with the coil 25. To the coil 25 are connected electrodes 238 and 239 for flowing the current.

Figure 11:
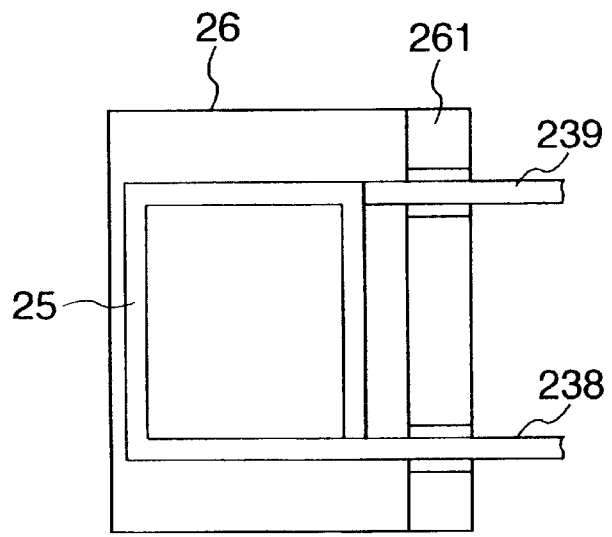
FIG. 11 is a rear view of an upper yoke for use in the load arm mounted in the magnetic disk apparatus according to the fifth embodiment of the present invention.

The method of manufacturing the load arm according to the fifth embodiment will be described below. The permanent magnet 24 is adhered on the movable member 11 by mean of the adhesive. Alternatively, the film is formed directly on the movable member 11 by the sputtering method or the vacuum depositing method. The upper yoke 26 is formed by machining the plate which is constituted of the compound of iron and nickel. The coil 25 is formed by winding the copper coated wire. The coil 25 is adhered to the surface of the upper yoke 26 by the adhesive. FIG. 11 shows the structure of the upper yoke 26. As the coil 25 may be used the monolithic type coil which is formed by laminating the insulating film, the first layer electrode, the interlaminar insulating film and the second layer electrode on the surface of the upper yoke 26. The upper yoke fixing member 261 is fixed to the upper yoke 26 by the adhesive. These members are fixed to the load arm 12 so that the coil 25 may be located just over the permanent magnet.

The operation of the magnetic disk apparatus of the fifth embodiment will be described. After the load arm 12 is positioned by the voice coil motor 142 which is the first actuator, the electric current flows into the coil 25 through the electrodes 238, 239 in accordance with the difference between the target position and the actually positioned position. The Lorentz force acts on the coil 25 in accordance with the current. However, since the coil is fixed to the load arm 12, a reaction is applied to the permanent magnet 24 and thereby the movable member 11 is rotated. The rotation of the movable member 11 allows the magnet head 31 to be positioned on the target position.

Finally, the effect of the fifth embodiment will be described. The magnitude of the magnetic attraction force for use in the first embodiment is substantially proportional to the square of the flowing electric current. Thus, it is necessary to perform a complicated calculation in order to find the current value required for the positioning. On the other hand, the Lorentz force for use in the fifth embodiment is proportional to the flowing current. Accordingly, the calculation of the current value necessary for the positioning is facilitated, thereby resulting in the more advantageous structure for the high-speed positioning. In the fifth embodiment, the permanent magnet 24 is located on the movable member 11. The upper yoke 26, which the coil 25 constituting magnetic field generating means is attached to, is fixed to the load arm which is the support member so that it may be located over the permanent magnet 24. On the contrary, the permanent magnet 24 is located on the load arm. The upper yoke 26, which the coil 25 is attached to, is fixed to the movable member so that it may be located over the permanent magnet 24 on the load arm. In this case, the similar effect can be achieved.

FIG. 12 is a plan view of the structure of the load arm mounted in the magnetic disk apparatus according to a sixth embodiment of the present invention. In the sixth embodiment, coils 271 and 272 for detecting the position are disposed in the position opposite to the end of the permanent magnet 24 (the end perpendicular to the axis of the load arm 12) on the load arm 12 in the fifth embodiment. Since the other arrangement is the same as the fifth embodiment, the description thereof is omitted. As described in the third embodiment, in the magnetic disk apparatus having the second actuator for positioning the magnetic head, it is necessary to know the position of the movable member 11 with respect to the load arm 12. In the sixth embodiment, the position of the movable member 11 with respect to the load arm 12 is detected by the use of an electromagnetic induction voltage generated in the position detecting coils 271 and 272 by the movement of the permanent magnet 24 on the movable member 11.

By the use of such an apparatus, the position of the movable member 11 with respect to the load arm 12 can be rapidly acquired with high accuracy. Accordingly, the magnetic disk apparatus of the sixth embodiment is as advantageous for the improvement of high speed and high density as that of the third embodiment.

Figure 14:
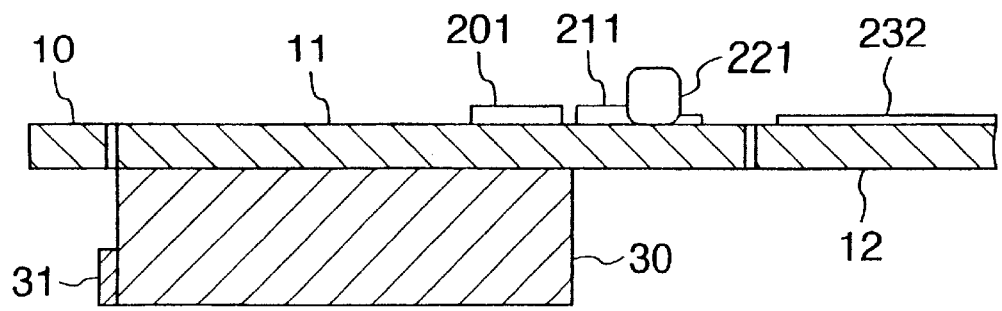
FIG. 14 is a cross sectional view taken along line XIV—XIV of the embodiment shown in FIG. 13.
Figure 13:
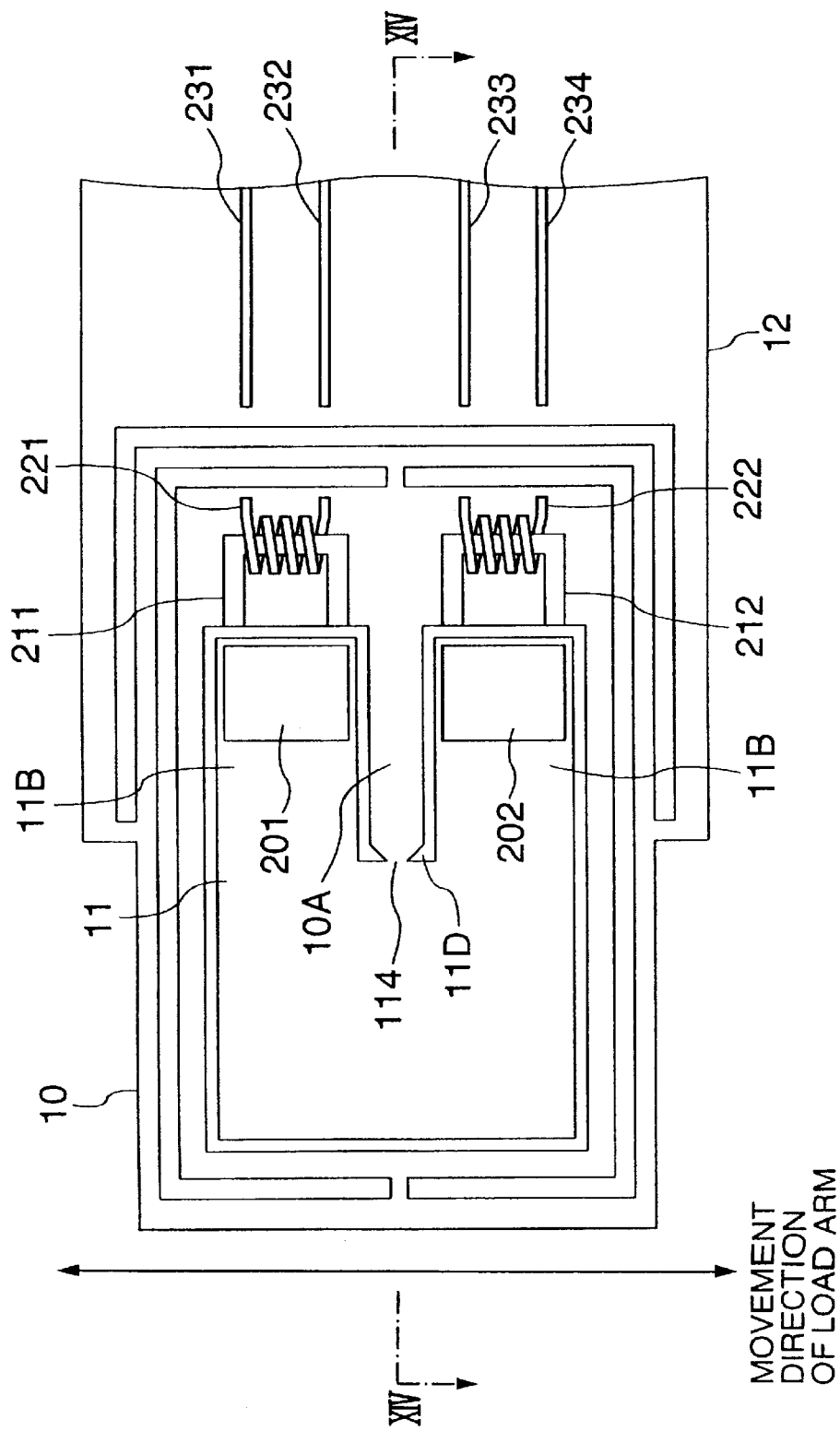
FIG. 13 is a plan view of the load arm mounted in the magnetic disk apparatus according to a seventh embodiment of the present invention.

FIG. 13 is a plan view of the structure of the load arm 12 mounted in the magnetic disk apparatus according to a seventh embodiment of the present invention. FIG. 14 is a cross sectional view taken along line XIV—XIV of this load arm 12.

In the seventh embodiment, the concavity is formed on the tip end of the load arm 12. The gimbal plate 10 is supported so that it may be fitted into the concavity. The movable member 11 is disposed in the gimbal plate 10. The movable member 11 is rectangular in shape so that it may have a concavity 11D at the center thereof on the side of the load arm 12. The movable member 11 is formed so that a predetermined space may be provided on the periphery thereof between the movable member 11 and the gimbal plate 10. A protrusion 10A is formed on the gimbal plate 10 so that it may be fitted in the concavity 11D with a required space. The movable member 11 is supported to the gimbal plate 10 by the hinge mechanism section 114 on the tip end of the protrusion 10A. The movable member 11 is rotated with respect to the gimbal plate 10 within the surface substantially parallel to the recording surface of the magnetic disk 15.

On the back surface of the movable member 11 is fixed the slider 30 to which the magnetic head 31 is mounted. The soft magnetic films 201 and 202 are fixed on the upper surfaces of the protrusions 11E which form both the sides of the concavity 11D of the movable member 11, respectively. The yokes 211, 212 and the coils 221, 222 of the soft magnetic material are fixed to the positions where the soft magnetic films 201 and 202 on the gimbal plate 10 are opposite to the axial ends of the load arm 12, respectively. The electrodes 231, 232 for flowing the electric current into the coil 221 and the electrodes 233, 234 for flowing the current into the coil 222 are arranged on the load arm 12. The center of gravity of the movable member 11 and the magnetic head 31, the slider 30 and the soft magnetic films 201, 202 mounted in the movable member coincides with the position of the hinge mechanism section 114. when the load arm 12, the gimbal plate 10 and the movable member 11 are cut out of a plate material, the plate material is left in a predetermined size so that the gimbal plate 10 and the movable member 11 may be connected to each other. This connection of the gimbal plate 10 and the movable member 11 is used as the hinge mechanism section 114. Accordingly, the hinge mechanism section 114 is not the typical hinge mechanism which includes a hole and a pin which is fitted in the hole. A wire bonding method is used for the connection of the coils on the gimbal plate and the electrodes on the load arm (not shown in FIGS. 13 and 14).

In the seventh embodiment, the second actuator for positioning the head is constituted by including the movable member 11, the soft magnetic films 201, 202, the yokes 211, 212, the coils 221, 222, the electrodes 231, 232, 233, 234 and the hinge mechanism section 114. The operation of the seventh embodiment is the same as that of the first embodiment. On the other hand, since all the movable members are included in the gimbal plate, the size of the load arm can be reduced, compared to the first embodiment.

Figure 15:
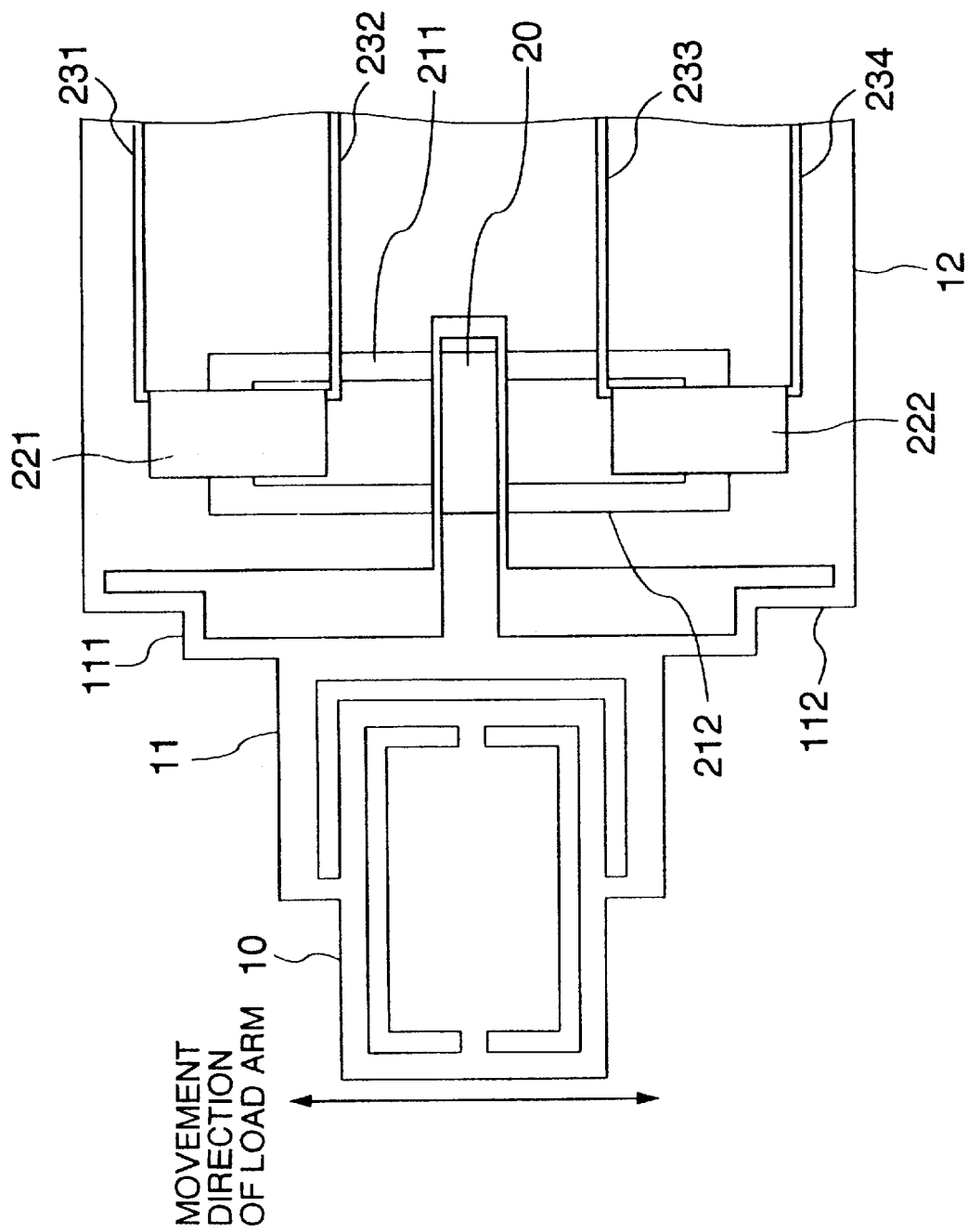
FIG. 15 is a plan view of the load arm mounted in the magnetic disk apparatus according to an eighth embodiment of the present invention.

FIG. 15 is a plan view of the structure of the load arm 12 mounted in the magnetic disk apparatus according to an eighth embodiment of the present invention. The difference between the eighth and first embodiments is as follows. Compared to the movable member supporting springs 111, 112 of the movable member 11, the width of the portion on the side of the load arm 12 is narrower than that of the portion on the side of gimbal plate 10. Thus, the width of the concavity formed on the tip end of the load arm 12 is narrowed. Since the other arrangement is the same as the first embodiment, the description thereof is omitted. Since the width of the concavity formed on the tip end of the load arm 12 is narrowed, the portions on both the sides of the concavity are wider. The sufficient space can be provided for the yokes 211, 212 and the coils 221, 222 which are arranged on the load arm 12 opposite to the soft magnetic film 20 disposed in the movable member 11, so that a performance of the second actuator can be improved. In this embodiment, the position of the center of gravity of the movable member 11 and all the members mounted in the movable member 11 coincides with the center of rotation of the movable member 11. Thus, the portion on the side of the load arm 12 must be axially longer than the movable member supporting springs 111, 112 of the movable member 11. Alternatively, the soft magnetic film 20 must be weighted.

In each embodiment described above, the movable member 11 is elastically supported on the load arm 12 or on the gimbal plate 10 by the movable member supporting springs or the hinge mechanism section 114. Both of the movable member supporting springs and the hinge mechanism section 114 achieve the rotation of the movable member 11 within the range of elastic deformation. Thus, when a rotating force generated by an excitation of the coils 221, 222 and the coil 25 is lost due to a degauss of the coils, the movable member 11 automatically returns to a reference position (the position where the movable member 11 is not rotated in any direction). Accordingly, an amount of drive of the second actuator is always calculated as the amount of movement (rotation) from the reference position, so that this calculation is made easy.

According to each embodiment described above, in addition to the voice coil motor for use in the positioning of the support member (load arm) which has heretofore supported the head, it is possible to provide the second actuator for positioning the head which can be driven at as low a voltage as 5 V or less, is not vibrated during the positioning operation of the support member and can be formed without the necessity for a complicated assembly step. Therefore, the recording density of the rotating disk type information storage apparatus can be greatly improved.

According to the present invention, it is possible to provide the actuator for positioning the head which can be driven at as low a voltage as 5 V or less, is not vibrated during the positioning operation of the support member for supporting the head and can be formed without the necessity for the complicated assembly step. Therefore, the recording density of the rotating disk type information storage apparatus can be greatly improved.

What is claimed is:

1. A rotating disk type information storage apparatus having a rotating disk for storing information therein, a head for writing/reading information in said rotating disk, a support member for supporting said head and a first actuator for moving said support member to a predetermined position on said rotating disk, said rotating disk type information storage apparatus comprising:

a second actuator including a movable member and a driving force generating member, said movable member being supported by said support member and being capable of rotating about a vertical axis perpendicular to a recording surface of said rotating disk, said driving force generating member rotating said movable member about said vertical axis, said movable member being integrated with said support member, and being disposed at a location adjacent to the head located at a tip end side of said support member;

said head being mounted to said movable member; and a center of gravity of total weight of said movable member and all the members mounted to said movable member generally coinciding with a center of rotation of said movable member.

2. A rotating disk type information storage apparatus having a rotating disk for storing information therein, a head for writing/reading information in said rotating disk, a support member for supporting said head and a first actuator for moving said support member to a predetermined position on said rotating disk, said rotating disk-type information storage apparatus comprising:

a second actuator including a movable member and a driving force generating member, said movable member being supported by said support member and being capable of rotating about a vertical axis perpendicular to a recording surface of said rotating disk, said driving force generating member rotating said movable member about said vertical axis, said movable member being supported to said support member by a plurality of movable member supporting springs as elastically deformable, and being disposed at a location adjacent to the head located at a tip end side of said support member;

all of said support member, said movable member and said movable member supporting springs being integrated with one another;

said head being mounted to said movable member; and a center of gravity of total weight of said movable member and all the members mounted to said movable member generally coinciding with a center of rotation of said movable member.

3. A rotating disk type information storage apparatus having a rotating disk for storing information therein, a head for writing/reading the information in said rotating disk, a support member for supporting said head and a first actuator for moving said support member to a predetermined position on said rotating disk, said rotating disk type information storage apparatus comprising:

a second actuator including a movable member and a driving force generating member, said movable member being supported by said support member and being capable of rotating about an axis perpendicular to a recording surface of said rotating disk, said driving force generating member rotating said movable member about said vertical axis, said movable member being supported by said support member by a single hinge mechanism section, and being disposed at a location adjacent to the head located at a tip end side of said support member;

all of said support member, said movable member and said hinge mechanism section being integrated with one another;

said head being mounted to said movable member; and a center of gravity of total weight of said movable member and all the members mounted to said movable member generally coinciding with a position of said hinge mechanism section.

4. A rotating disk type information storage apparatus having a rotating disk for storing information therein, a head for writing/reading information in said rotating disk, a support member for supporting said head and a first actuator for moving said support member to a predetermined position on said rotating disk, said rotating disk type information storage apparatus comprising:

a second actuator including a movable member and a driving force generating member, said movable member being supported by said support member and being capable of rotating about a vertical axis perpendicular to a recording surface of said rotating disk, said driving force generating member rotating said movable member about said vertical axis, said movable member being integrated with said support member, and being disposed at a location adjacent to the head located at a tip end side of said support member;

said head being mounted to said movable member; and said head and said driving force generating member being opposite to each other about a center of rotation of said movable member.

5. The rotating disk type information storage apparatus according to any one of claims 1 through 4, wherein said driving force generating member includes:

a soft magnetic member including a soft magnetic material located on said movable member; and a yoke including a coil and the soft magnetic material located on said support member.

6. The rotating disk type information storage apparatus according to any one of claims 1 through 4, wherein said driving force generating member includes:

a permanent magnet including the hard magnetic material located on said movable member; and a yoke including the soft magnetic material located on said support member or on an upper yoke fixing member fixed to said support member.

7. A rotating disk type information storage apparatus having a rotating disk for storing information therein, a head for writing/reading information in said rotating disk, a support member for supporting said head and a first actuator for moving said support member to a predetermined position on said rotating disk, said rotating disk-type information storage apparatus comprising:

a second actuator including a movable member and a driving force generating member, said movable member being supported by said support member and being capable of rotating about a vertical axis perpendicular to a recording surface of said rotating disk, said movable member being integrated with said support member, and being disposed at a location adjacent to the head located at a tip end side of said support member;

said driving force generating member rotating said movable member about said vertical axis, said head being mounted to said movable member; and a sensor for detecting a position of said movable member with respect to said support member being disposed on said support member, on said movable member or on both of said support member and said movable member.

8. A rotating disk type information storage apparatus having a rotating disk for storing information therein, a head for writing/reading information in said rotating disk, a support member for supporting said head and a first actuator for moving said support member to a predetermined position on said rotating disk, said rotating disk type information storage apparatus comprising:

a second actuator including a movable member and a driving force generating member, said movable member being supported by said support member and being capable of rotating about an axis perpendicular to a recording surface of said rotating disk, said movable member being integrated with said support member, and being disposed at a location adjacent to the head located at a tip end side of said support member;

said driving force generating member rotating said movable member about said vertical axis, said head being mounted to said movable member; and said driving force generating member having a pair of electrodes which are opposite to each other on said support member and said movable member.

9. A rotating disk type information storage apparatus having a rotating disk for storing information therein, a head for writing/reading information in said rotating disk, a support member for supporting said head and a first actuator for moving said support member to a predetermined position on said rotating disk, said rotating disk type information storage apparatus comprising:

a second actuator including a movable member and a driving force generating member, said movable member being supported by said support member and being capable of rotating about a vertical axis perpendicular to a recording surface of said rotating disk, said movable member being integrated with said support member, and being disposed at a location adjacent to the head located at a tip end side of said support member; said driving force generating member rotating said movable member about said vertical axis, said head being mounted to said movable member;

said driving force generating member having a permanent magnet including a hard magnetic material located on said movable member or on said support member and magnetic field generating member located in a position opposite to said permanent magnet located on said support member or on said movable member.

10. The rotating disk type information storage apparatus according to any one of claims 1 through 9, wherein said movable member is supported on said load arm by an elastically deformable supporting structure.

11. A support member used in a rotating disk type information storage apparatus having a rotating disk for storing information therein, a head for writing/reading information in said rotating disk, a support member for supporting said head and a first actuator for moving said support member to a predetermined position on said rotating disk, wherein said movable member is integrated with said support member, said movable member being supported by said support member and being capable of rotating about a vertical axis perpendicular to a recording surface of said rotating disk, and said moveable member is disposed at a location adjacent to the head located at a tip end side of said support member; and said head is mounted to said movable member.

12. A magnetic disk apparatus including a magnetic disk having a magnetic medium for storing information therein, a magnetic head for writing/reading information in said magnetic disk, a slider which said magnetic head is mounted to and which floats said magnetic head over said magnetic disk, a load arm for supporting said slider and a first actuator for moving said load arm to a predetermined position on said magnetic disk, said magnetic disk apparatus comprising:

a second actuator including a movable member and a driving force generating member, said movable member being supported by said load arm and being capable of rotating about a vertical axis perpendicular to a recording surface of said magnetic disk, said driving force generating member rotating said movable member about said vertical axis, said movable member being integrated with said load arm, and being disposed at a location adjacent to the head located at a tip end side of said support member;

said slider being mounted to said movable member; and a center of gravity of total weight of said movable member and all the members mounted to said movable member generally coinciding with a center of rotation of said movable member.

13. The magnetic disk apparatus according to claim 12, wherein said movable member is supported on said load arm by an elastically deformable supporting structure.

14. A magnetic disk apparatus including a magnetic disk having a magnetic medium for storing information therein, a magnetic head for writing/reading information in said magnetic disk, a slider which said magnetic head is mounted to and which floats said magnetic head over said magnetic disk, a load arm for supporting said slider and a first actuator for moving said load arm to a predetermined position on said magnetic disk, said magnetic disk apparatus comprising:

a second actuator disposed between said slider and said load arm, said second actuator including a movable member and a driving force generating member, said movable member being capable of rotating about a vertical axis perpendicular to a recording surface of said magnetic disk, said driving force generating member rotating said movable member about said vertical axis, said slider being mounted to said movable member, said movable member being integrated with said support member, and being disposed at a location adjacent to the head located at a tip end side of said support member; and a center of gravity of total weight of said movable member and all the members mounted to said movable member generally coinciding with a center of rotation of said movable member.

15. A magnetic disk apparatus including a magnetic disk having a magnetic medium for storing information therein, a magnetic head for writing/reading information in said magnetic disk, a slider which said magnetic head is mounted to and which floats said magnetic head over said magnetic disk, a load arm for supporting said slider and a first actuator for moving said load arm to a predetermined position on said magnetic disk, said magnetic disk apparatus comprising:

a second actuator arranged between said slider and said load arm, said second actuator including a movable member and a driving force generating member, said movable member being capable of rotating about a vertical axis perpendicular to a recording surface of said magnetic disk, said driving force generating member rotating said movable member about said vertical axis, said slider being mounted to said movable member, said movable member being integrated with said support member, and being disposed at a location adjacent to the head located at a tip end side of said support member; and a sensor for detecting a position of said movable member with respect to said load arm being disposed on said second actuator.

16. A method of manufacturing a support member used in the rotating disk type information storage apparatus according to any one of claims 1 through 4, said support member having a main component of ones of silicon, silicon oxide, stainless steel, nickel, compound of iron and nickel and copper, the method of manufacturing said support member comprising any one of the steps of:

shaping the silicon and the silicon oxide by etching;

growing one of the copper, the nickel, the stainless steel or the compound of iron and nickel by a plating method; or shaping a foil containing one of the copper, the nickel, the stainless steel or the compound of iron and nickel by etching or pressing.

17. A rotating disk type information storage apparatus having a rotating disk for storing information therein, a head for writing/reading information in said rotating disk, a support member or supporting said head and a first actuator for moving said support member to a predetermined position on said rotating disk, said rotating disk type information storage apparatus comprising:

a second actuator including a movable member and a driving force generating member, said movable member being supported by said support member and being capable of rotating about an axis perpendicular to a recording surface of said rotating disk, said driving force generating member rotating said movable member about the perpendicular said axis, said movable member being integrated with said support member, and being disposed at a location adjacent to the head located at a tip end side of said support member.

18. A rotating disk type information storage apparatus having a rotating disk for storing information therein, a head for writing/reading information in said rotating disk, a support member for supporting said head and a first actuator for moving said support member to a predetermined position on said rotating disk, said rotating disk type information storage apparatus comprising:

a second actuator including a movable member and a driving force generating member, said movable member being supported by said support member and being capable of rotating about a vertical axis perpendicular to a recording surface of said rotating disk, said driving force generating member rotating said movable member about said vertical axis, said movable member and said support member being a monolithic structure and said moveable member being disposed at a location adjacent to the head located at a tip end side of said support member;

said head being mounted to said movable member; and a center of gravity of total weight of said movable member and all the members mounted to said movable member generally coinciding with a center of rotation of said movable member.

19. A rotating disk type information storage apparatus having a rotating disk for storing information therein, a head for writing/reading information in said rotating disk, a support member for supporting said head and a first actuator for moving said support member to a predetermined position on said rotating disk, said rotating disk-type information storage apparatus comprising:

a second actuator including a movable member and a driving force generating member, said movable member being supported by said support member and being capable of rotating about a vertical axis perpendicular to a recording surface of said rotating disk, said driving force generating member rotating said movable member about said vertical axis, said movable member being supported to said support member by a plurality of movable member supporting springs as elastically deformable, and being disposed at a location adjacent to the head located at a tip end side of said support member;

all of said support member, said movable member and said movable member supporting springs being a monolithic structure;

said head being mounted to said movable member; and a center of gravity of total weight of said movable member and all the members mounted to said movable member generally coinciding with a center of rotation of said movable member.

20. A rotating disk type information storage apparatus having a rotating disk for storing information therein, a head for writing/reading information in said rotating disk, a support member for supporting said head and a first actuator for moving said support member to a predetermined position on said rotating disk, said rotating disk type information storage apparatus comprising:

a second actuator including a movable member and a driving force generating member, said movable member being supported by said support member and being capable of rotating about a vertical axis perpendicular to a recording surface of said rotating disk, said driving force generating member rotating said movable member about said vertical axis, said movable member and said support member being a monolithic structure, and said moveable member being disposed at a location adjacent to the head located at a tip end side of said support member;

said head being mounted to said movable member; and said head and said driving force generating member being opposite to each other about a center of rotation of said movable member.

21. The rotating disk type information storage apparatus according to any one of claims 18 through 20, wherein said driving force generating member includes:

a soft magnetic member including a soft magnetic material located on said movable member; and a yoke including a coil and the soft magnetic material located on said support member.

22. A magnetic disk apparatus including a magnetic disk having a magnetic medium for storing information therein, a magnetic head for writing/reading information in said magnetic disk, a slider which said magnetic head is mounted to and which floats said magnetic head over said magnetic disk, a load arm for supporting said slider and a first actuator for moving said load arm to a predetermined position on said magnetic disk, said magnetic disk apparatus comprising:

a second actuator including a movable member and a driving force generating member, said movable member being supported by said load arm and being capable of rotating about a vertical axis perpendicular to a recording surface of said magnetic disk, said driving force generating member rotating said movable member about said vertical axis, said movable member and load arm being a monolithic structure, and said moveable member being disposed at a location adjacent to the head located at a tip end side of said support member;

said slider being mounted to said movable member; and a center of gravity of total weight of said movable member and all the members mounted to said movable member generally coinciding with a center of rotation of said movable member.

23. The magnetic disk apparatus according to claim 22, wherein said movable member is supported on said load arm by an elastically deformable supporting structure.

24. The rotating disk type information storage apparatus according to any one of claims 18 through 22, wherein said movable member is supported on said load arm by an elastically deformable supporting structure.

25. A method of manufacturing a support member used in the rotating disk type information storage apparatus according to any one of claims 18 through 20, said support member having a main component of ones of silicon, silicon oxide, stainless steel, nickel, compound of iron and nickel and copper, the method of manufacturing said support member comprising any one of the steps of:

shaping the silicon and the silicon oxide by etching;

growing one of the copper, the nickel, the stainless steel or the compound of iron and nickel by a plating method; or shaping a foil containing one of the copper, the nickel, the stainless steel or the compound of iron and nickel by etching or pressing.

* * * * *